United States Patent
Johnson et al.

(10) Patent No.: US 9,610,737 B2
(45) Date of Patent: Apr. 4, 2017

(54) 3D THERMOPLASTIC COMPOSITE PULTRUSION SYSTEM AND METHOD

(71) Applicant: Ebert Composites Corporation, Chula Vista, CA (US)

(72) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 0 days.

(21) Appl. No.: 15/008,814

(22) Filed: Jan. 28, 2016

(65) Prior Publication Data

US 2016/0257058 A1    Sep. 8, 2016

Related U.S. Application Data

(62) Division of application No. 14/864,544, filed on Sep. 24, 2015.

(Continued)

(51) Int. Cl.
*B29C 70/52* (2006.01)
*B29C 51/20* (2006.01)
(Continued)

(52) U.S. Cl.
CPC ............ *B29C 70/526* (2013.01); *B29C 51/14* (2013.01); *B29C 51/20* (2013.01); *B29C 51/261* (2013.01);
(Continued)

(58) Field of Classification Search
CPC ..... B29C 51/46; B29C 41/421; B29C 51/261; B29C 51/14; B29C 70/52–70/528; B29C 51/008; B29C 51/20; B29C 51/264; B29C 70/526; B29C 43/021; B29C 43/222; B29C 43/361; B29C 2043/3613; B29C 2043/3621; B29C 2043/3623; B29C 2043/3634; B29C 43/48; B29C 2043/483; B29C 2043/5833;
(Continued)

(56) References Cited

U.S. PATENT DOCUMENTS 4,777,005 A    10/1988  Miller
5,026,447 A     6/1991  O'Connor
(Continued)

FOREIGN PATENT DOCUMENTS

EP    2599604 A2    6/2013
WO    2012139582 A1    10/2012

OTHER PUBLICATIONS

International Search Report and Written Opinion for related PCT application No. PCT/US2016/020653, mailed on May 18, 2016, in 12 pages.

*Primary Examiner* — Jeffrey Wollschlager
(74) *Attorney, Agent, or Firm* — Procopio Cory Hargreaves and Savitch LLP

(57) ABSTRACT

A 3D thermoplastic pultrusion system and method based upon a 3D variable die system and including one or more sets of 3D thermoplastic forming machines to continuously produce thermoplastic composite pultrusions with at least one of varying cross-section geometry and constant surface contours, varying cross-section geometry and varying surface contours, and constant cross-section geometry and varying surface contours.

18 Claims, 16 Drawing Sheets

Related U.S. Application Data

(60) Provisional application No. 62/128,376, filed on Mar. 4, 2015.

(51) Int. Cl.

| | | |
|---|---|---|
| *B29C 51/26* | (2006.01) | |
| *B29C 51/46* | (2006.01) | |
| *G05B 19/4099* | (2006.01) | |
| *B29C 51/14* | (2006.01) | |
| *B29C 51/42* | (2006.01) | |
| *E04B 1/32* | (2006.01) | |
| *B29C 43/48* | (2006.01) | |
| *B29C 47/88* | (2006.01) | |
| *B29C 43/22* | (2006.01) | |
| *B29C 33/02* | (2006.01) | |
| *B29C 59/04* | (2006.01) | |
| *B29C 53/04* | (2006.01) | |
| *B29K 101/12* | (2006.01) | |
| *B29L 31/08* | (2006.01) | |

(52) U.S. Cl.
CPC .......... *B29C 51/264* (2013.01); *B29C 51/421* (2013.01); *B29C 51/46* (2013.01); *B29C 70/52* (2013.01); *E04B 1/32* (2013.01); *G05B 19/4099* (2013.01); *B29C 33/026* (2013.01); *B29C 43/228* (2013.01); *B29C 43/48* (2013.01); *B29C 47/885* (2013.01); *B29C 53/043* (2013.01); *B29C 59/043* (2013.01); *B29C 70/521* (2013.01); *B29C 70/522* (2013.01); *B29C 70/525* (2013.01); *B29C 70/527* (2013.01); *B29C 70/528* (2013.01); *B29C 2043/483* (2013.01); *B29K 2101/12* (2013.01); *B29L 2031/08* (2013.01); *E04B 2001/3223* (2013.01); *G05B 2219/49007* (2013.01)

(58) Field of Classification Search
CPC ............... E04B 1/32; E04B 2001/3223; B05B 19/4099; G05B 2219/49007; B29L 2031/08; B29K 2101/12
See application file for complete search history.

(56) References Cited

U.S. PATENT DOCUMENTS

| | | | |
|---|---|---|---|
| 5,091,036 A * | 2/1992 | Taylor | B29C 35/0261 156/180 |
| 5,264,060 A | 11/1993 | Lambing | |
| 5,266,021 A | 11/1993 | Jacobsen | |
| 5,308,228 A | 5/1994 | Benoit et al. | |
| 5,352,311 A | 10/1994 | Quigley et al. | |
| 5,353,694 A | 10/1994 | Fins | |
| 5,458,476 A | 10/1995 | Medwin et al. | |
| 5,573,716 A | 11/1996 | Jacobson | |
| 6,290,895 B1 | 9/2001 | Wang et al. | |
| 6,558,590 B1 * | 5/2003 | Stewart | B29C 43/183 264/134 |
| 6,645,333 B2 | 11/2003 | Johnson et al. | |
| 6,676,785 B2 | 1/2004 | Johnson | |
| 6,843,565 B2 | 1/2005 | Evans et al. | |
| 7,785,693 B2 | 8/2010 | Johnson | |
| 8,123,510 B1 | 2/2012 | Johnson | |
| 8,562,881 B2 | 10/2013 | Hofmann | |
| 8,747,098 B1 * | 6/2014 | Johnson | B29C 70/526 156/245 |
| 2001/0010248 A1 * | 8/2001 | Vodermayer | B29C 70/526 156/180 |
| 2003/0227107 A1 * | 12/2003 | Stewart | B29C 43/183 264/236 |
| 2004/0051986 A1 | 3/2004 | Sahara et al. | |
| 2005/0025948 A1 | 2/2005 | Johnson | |
| 2005/0056362 A1 | 3/2005 | Benson | |
| 2008/0099131 A1 | 5/2008 | Umeda | |
| 2011/0014429 A1 | 1/2011 | Hogg | |
| 2011/0020130 A1 | 1/2011 | Murakami et al. | |
| 2011/0120636 A1 | 5/2011 | Bailey et al. | |
| 2011/0121479 A1 * | 5/2011 | Lengsfeld | B29C 70/52 264/70 |
| 2013/0330496 A1 | 12/2013 | Kray et al. | |
| 2014/0065312 A1 | 3/2014 | Johnson | |
| 2014/0117582 A1 * | 5/2014 | Wilkerson | B29C 70/52 264/171.13 |
| 2014/0175696 A1 * | 6/2014 | Foor | B29C 70/504 264/175 |
| 2014/0374946 A1 * | 12/2014 | Prebil | B29C 43/222 264/165 |
| 2015/0022423 A1 | 1/2015 | Johnson et al. | |
| 2015/0367584 A1 * | 12/2015 | Daton-Lovett | B29C 70/504 264/171.13 |

* cited by examiner

3D THERMOPLASTIC COMPOSITE PULTRUSION SYSTEM AND METHOD

CROSS-REFERENCE TO RELATED APPLICATIONS

This application is a divisional of U.S. patent application Ser. No. 14/864,544, filed Sep. 24, 2015, which claims priority to U.S. Provisional Patent Application No. 62/128,376, filed on Mar. 4, 2015, all of which are incorporated by reference herein.

FIELD OF THE INVENTION

The present invention relates to 3D pultrusion systems and methods.

BACKGROUND OF THE INVENTION

In recent times, advances have been made in thermoplastic 3D printing using CNC technology and 3-axis positioning. These 3D printing machines allow a wide variety of shapes to be produced with nothing more than a CAD drawing. That is, they have the advantage of creating a complex shape without a mold.

SUMMARY OF THE INVENTION

An aspect of the invention involves a 3D pultrusion system and method based upon a 3D/variable die system to continuously produce thermoplastic composite pultrusions with at least one of varying cross-section geometry and constant surface contours, varying cross-section geometry and varying surface contours, and constant cross-section geometry and varying surface contours.

The 3D pultrusion system and method enables a myriad of industries, from automotive, industrial, and aerospace to create continuous, automated complex shapes using only CAD programs and CNC processing without the need for expensive molds.

Another aspect of the invention involves a 3D thermoplastic pultrusion system. The pultrusion system comprises one or more sets of 3D thermoplastic forming machines; and a CNC control system controlling the one or more sets of 3D thermoplastic forming machines to form a heated prepreg thermoplastic composite material into a 3D thermoplastic composite pultrusion.

One or more implementations of the aspect of the invention recited immediately above includes one more of the following: The 3D thermoplastic composite pultrusion has varying cross-section geometry and constant surface contours. The 3D thermoplastic composite pultrusion has a constant cross-section geometry and varying surface contours. The 3D thermoplastic composite pultrusion has a varying cross-section geometry and varying surface contours. 23. The 3D thermoplastic composite pultrusion has varying surface contours in both a pultrusion direction and 90 degrees to the pultrusion direction. The 3D thermoplastic composite pultrusion is created without molds. The one or more sets of 3D thermoplastic forming machines include a plurality of CNC actuators and a flexible chilled band shapeable by the CNC actuators to form the heated prepreg thermoplastic composite material into the thermoplastic composite pultrusion. Swivel joints connect the plurality of CNC actuators to the chilled band. The CNC control system includes a computer system having a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to at least one of extend and retract the CNC actuators. The CNC control system at least one of extends and retracts the CNC actuators with an accuracy of +/−0.001 inches. The CNC control system includes a computer system having a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to command the plurality of actuators to specific location to flex and contour the chilled band. A material advancement system incrementally advances the thermoplastic composite pultrusion an incremental amount and the CNC control system includes a computer system having a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements configured to control the 3D thermoplastic forming machines so that the chilled band consolidate the heated prepreg thermoplastic composite material into a specific shape for each increment of material advancement. The one or more sets of 3D thermoplastic forming machines are disposed above and below the heated prepreg thermoplastic composite material. The 3D thermoplastic pultrusion system continuously produces at least one of complex body panels such as doors and hoods, aircraft body panels, luggage compartments, airplane interior sections, aerodynamic surfaces, complex piping, duct-work, and any component that currently requires a large mold. The heated prepreg thermoplastic composite material includes a fiber composite material including a first sandwich skin, a second sandwich skin, an interior core, and distinct groups of 3D Z-axis fibers that extend from the first sandwich skin to the second sandwich skin, linking the sandwich skins together. The flexible chilled band includes a release material. The 3D thermoplastic forming machines disposed above and below the heated prepreg thermoplastic composite material include the flexible chilled band. The 3D thermoplastic forming machines include servo motors that the CNC actuators are operatively coupled with. The 3D thermoplastic forming machines include pivot points that the actuators rotate about. The 3D thermoplastic forming machines include thrusting and retracting plates attached to the actuators. The 3D thermoplastic pultrusion system includes a heated die and the 3D thermoplastic pultrusion system is downstream of the heated die.

An additional aspect of the invention involves a method of creating a 3D thermoplastic composite pultrusion with a 3D thermoplastic pultrusion system including one or more sets of 3D thermoplastic forming machines. The method comprises providing composite material including one or more thermoplastic composite tapes; heating the composite material including one or more thermoplastic composite tapes with a heating mechanism; and controlling the one or more sets of 3D thermoplastic forming machines with a CNC control system to form the heated composite material including one or more thermoplastic composite tapes into a 3D thermoplastic composite pultrusion.

One or more implementations of the aspect of the invention recited immediately above includes one more of the following: The method further includes incrementally advancing the formed 3D thermoplastic composite pultrusion with a material advancement system. The 3D thermoplastic composite pultrusion has a varying cross-section geometry and constant surface contours. The 3D thermoplastic composite pultrusion has constant cross-section geometry and varying surface contours. The 3D thermoplastic composite pultrusion has a varying cross-section geometry and varying surface contours. The 3D thermoplastic composite pultrusion has varying surface contours in both a pultrusion direction and 90 degrees to the pultrusion direction. The 3D thermoplastic composite pultrusion is created without molds. The one or more sets of 3D thermoplastic forming machines include a plurality of CNC actuators and a flexible chilled band shapeable by the CNC actuators, and controlling includes shaping the flexible chilled band to form the 3D thermoplastic composite pultrusion with the plurality of CNC actuators. The 3D thermoplastic pultrusion system includes swivel joints connecting the plurality of CNC actuators to the chilled band. The CNC control system includes a computer system, and the method further includes at least one of controlling extending and retracting the CNC actuators with the computer system. The CNC control system at least one of extends and retracts the CNC actuators with an accuracy of +/−0.001 inches. The CNC control system includes a computer system, and the method further includes commanding the plurality of actuators to specific location to flex and contour the chilled band with the computer system. The method further includes incrementally advancing the formed 3D thermoplastic composite pultrusion with a material advancement system and wherein the CNC control system includes a computer system, and the method further includes controlling the 3D thermoplastic forming machines with the computer system so that the chilled band consolidates the heated composite material composite material into a specific shape for each increment of material advancement. The method further includes forming the 3D thermoplastic composite pultrusion with the one or more sets of 3D thermoplastic forming machines disposed above and below the heated composite material. The heated composite material includes a fiber composite material including a first sandwich skin, a second sandwich skin, an interior core, and distinct groups of 3D Z-axis fibers that extend from the first sandwich skin to the second sandwich skin, linking the sandwich skins together. The method further includes adding a release material to the flexible chilled band. The 3D thermoplastic forming machines disposed above and below the heated composite material include the flexible chilled band. The 3D thermoplastic forming machines include servo motors that the CNC actuators are operatively coupled with. The 3D thermoplastic forming machines include pivot points that the actuators rotate about. The 3D thermoplastic forming machines include thrusting and retracting plates attached to the actuators. The 3D thermoplastic composite pultrusion is at least one of complex body panels such as doors and hoods, aircraft body panels, luggage compartments, airplane interior sections, aerodynamic surfaces, complex piping, ductwork, and any component that currently requires a large mold.

A further aspect of the invention involves an airfoil manufactured by a process. The process comprises providing composite material including one or more thermoplastic composite tapes; heating the composite material including one or more thermoplastic composite tapes with a heating mechanism; and controlling one or more sets of 3D thermoplastic forming machines with a CNC control system to form the heated composite material including one or more thermoplastic composite tapes into the airfoil.

One or more implementations of the aspect of the invention described immediately above includes one or more of the following: The process further includes incrementally advancing the formed airfoil with a material advancement system. The airfoil has a varying cross-section geometry and constant surface contours. The airfoil has constant cross-section geometry and varying surface contours. The 3D thermoplastic composite pultrusion has a varying cross-section geometry and varying surface contours. The airfoil has varying surface contours in both a pultrusion direction and 90 degrees to the pultrusion direction. The process of manufacturing the airfoil is performed without molds. The one or more sets of 3D thermoplastic forming machines include a plurality of CNC actuators and a flexible chilled band shapeable by the CNC actuators, and controlling includes shaping the flexible chilled band to form the airfoil with the plurality of CNC actuators. The airfoil further includes swivel joints connecting the plurality of CNC actuators to the chilled band. The CNC control system includes a computer system, and the process further includes at least one of controlling extending and retracting the CNC actuators with the computer system. The CNC control system at least one of extends and retracts the CNC actuators with an accuracy of +/−0.001 inches. The CNC control system includes a computer system, and the process further includes commanding the plurality of actuators to specific location to flex and contour the chilled band with the computer system. The process further includes incrementally advancing the formed airfoil with a material advancement system and wherein the CNC control system includes a computer system, and the process further includes controlling the 3D thermoplastic forming machines with the computer system so that the chilled band consolidates the heated composite material composite material into a specific shape for each increment of material advancement. The process further includes forming the airfoil with the one or more sets of 3D thermoplastic forming machines disposed above and below the heated composite material. The heated composite material includes a fiber composite material including a first sandwich skin, a second sandwich skin, an interior core, and distinct groups of 3D Z-axis fibers that extend from the first sandwich skin to the second sandwich skin, linking the sandwich skins together. The process further includes adding a release material to the flexible chilled band. The 3D thermoplastic forming machines disposed above and below the heated composite material include the flexible chilled band. The 3D thermoplastic forming machines include servo motors that the CNC actuators are operatively coupled with. The 3D thermoplastic forming machines include pivot points that the actuators rotate about. The 3D thermoplastic forming machines include thrusting and retracting plates attached to the actuators.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

With reference to FIGS. 1-8, before describing embodiments of a 3D thermoplastic pultrusion forming machine/apparatus and method, an embodiment of a thermoplastic pultrusion die system ("system") 300 and method of processing using the same will first be described. The 3D thermoplastic pultrusion forming machine/apparatus and method is an improvement on the system 300 and method.

Figure 1A:
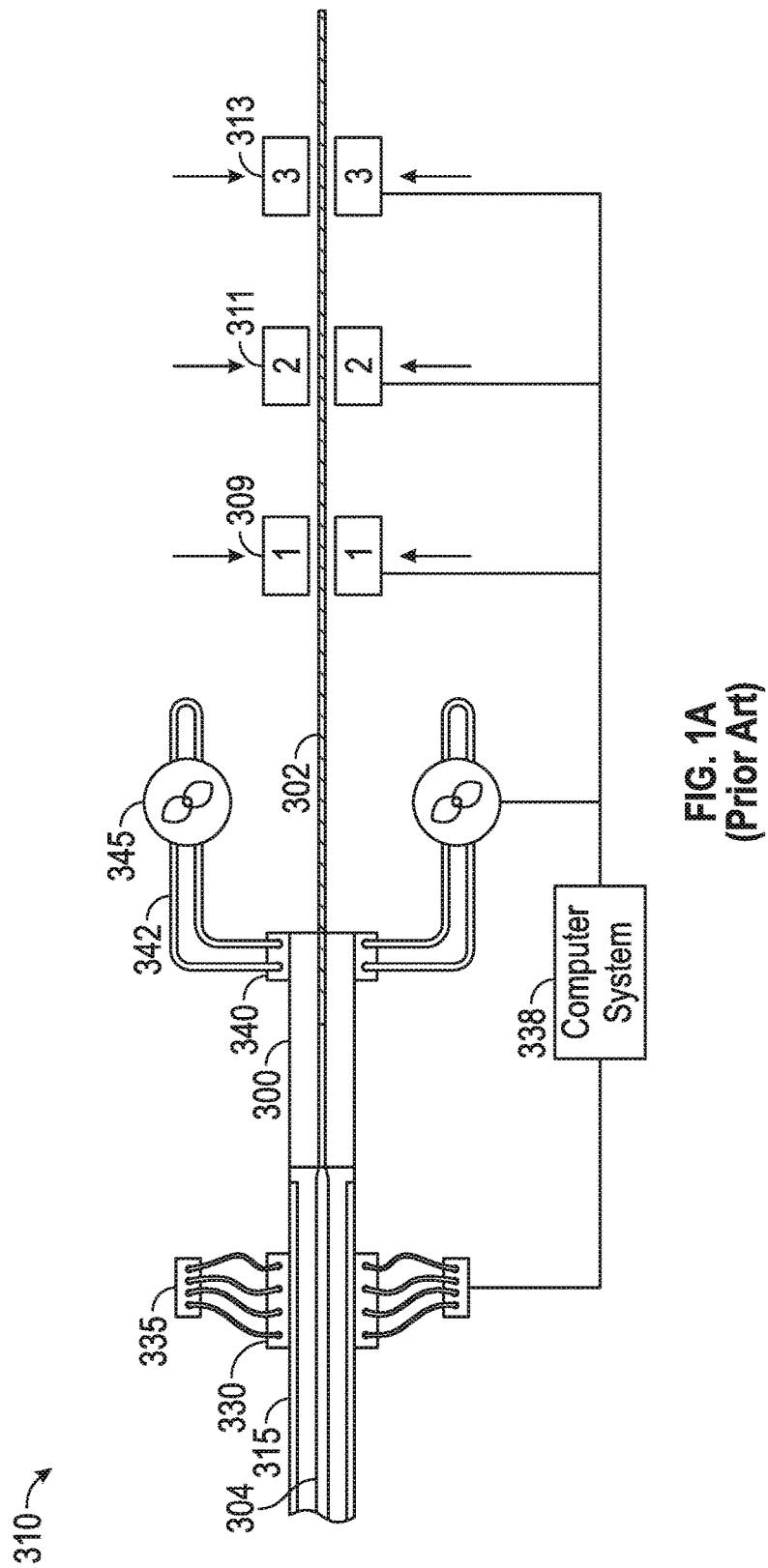
FIG. 1A is a diagram of an embodiment of an exemplary thermoplastic composite tape pultrusion process in which the thermoplastic pultrusion die system and method of the present invention may be incorporated into in one application.

With reference to FIG. 1A, before describing the system 300, an embodiment of an exemplary thermoplastic composite tape pultrusion processing assembly 310 and method that the thermoplastic pultrusion die system 300 and method may be a part of will first be described.

In the thermoplastic composite tape pultrusion processing assembly 310, the pultrusion process moves from left to right. From left-to-right, the assembly 310 includes a tunnel oven 315, the thermoplastic pultrusion die system 300, and a pultrusion gripper mechanism including one or more grippers (e.g., one, two, three) 309, 311, 313 in series. In FIG. 1A, a fairly short thermoplastic pultrusion die system 300 is shown, but in actuality the thermoplastic pultrusion die system 300 may extend forward in the process 20 feet or more to assist with heating of multiple tapes or plies of thermoplastic tape to achieve faster line speeds on the processing.

The one or more grippers 309, 311, 313 pull a solid part 302 from the thermoplastic pultrusion die system 300 by clamping and pulling in a hand-over-hand method, using either a combination of one, two or three grippers at a time. In an alternative embodiment, a mechanical motive transmitter other than one or more grippers is used such as, but not by way of limitation, nip rollers or a caterpillar dive system.

Raw material 304 includes a composite material including one or more thermoplastic composite tapes entering the thermoplastic pultrusion die system 300. Before raw material 304 enters the thermoplastic pultrusion die system 300, upstream of the thermoplastic pultrusion die system 300, the thermoplastic composite tapes are preheated in a pre-heating mechanism (e.g., tunnel oven) 315, which can be heated to a temperature just below a melt temperature of the thermoplastic resin of the thermoplastic composite tapes.

As the pultruded tape material exits the thermoplastic pultrusion die system 300, it is chilled and consolidated, as represented by the solid part 302. The transition from a series of individual thermoplastic composite tapes to the solid part 302 takes place in the thermoplastic pultrusion die system 300.

The thermoplastic pultrusion die system 300 preferably includes a heating mechanism (e.g., heater or hot zone) in the front of the thermoplastic pultrusion die system 300 heated by platens 330 using a series of heaters and controllers 335. At an end of thermoplastic pultrusion die system 300, just before the pultruded tape material exits, is a cooling mechanism (e.g., cooler or chilling zone) provided by chilling platens 340, which are physically attached to thermoplastic pultrusion die system 300. The platens 340 have a cooling water circuit 342 designed to carry cooling fluids such as water to a radiating system, shown here with a fan 345. In alternative embodiments, alternative heating mechanisms and/or cooling mechanism may be used with the thermoplastic pultrusion die system 300. A computer system 338 controls one of more of the components of the assembly 310.

Figure 1B:
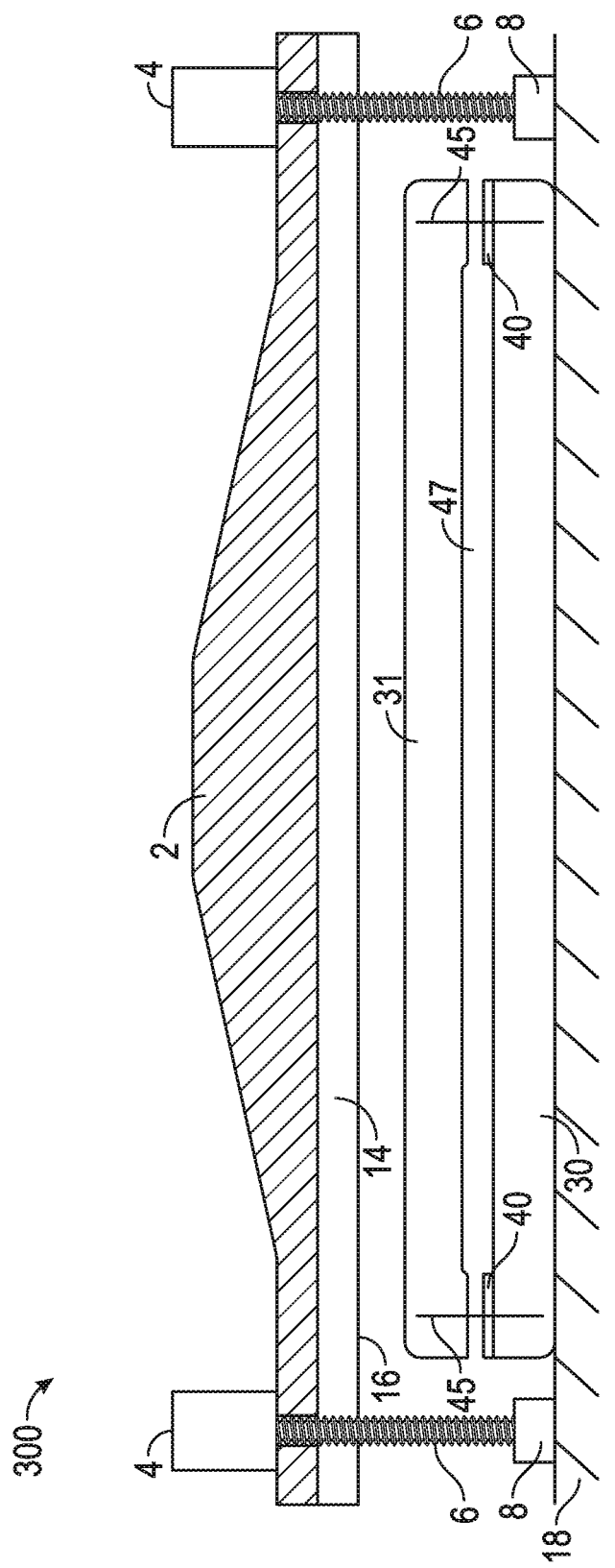
FIG. 1B is a side elevation view of an embodiment showing an end of a die and die cavity gap (end being defined as the exit of the die as one would view the die system from the position of the pultrusion grippers) of an embodiment of the thermoplastic pultrusion die system and method.

With reference to FIG. 1B, the thermoplastic pultrusion die system 300 is a die, platen, and frame arrangement. The thermoplastic pultrusion die system 300 is shown in elevation in FIG. 1B as if viewing from the pultrusion grippers 309, 311, 313 towards the downstream end of the thermoplastic pultrusion die system 300.

The thermoplastic pultrusion die system 300 includes a die bottom 30 (supported by a lower support 18) and a die top 31 separated by a die cavity gap 47. The die top 31 is bolted to the die bottom 30 at bolt holes 45. Along opposite edges of the die bottom 30 and die top 31 are elongated, narrow flat silicone seals 40. Load cells 8 are supposed by the lower support 18 are measure the load pressure at various locations in the thermoplastic pultrusion die system 300. The load cells 8 are operably coupled to CNC servo motors 4 via ball screws 6. A strongback 2 and a platen 14 move with rotation of the ball screws (and are associated with the die top 31 and/or die bottom 30) to increase or decrease the die cavity gap 47.

FIG. 1B shows the assembly of the die halves with the silicone seal 40 and the ball screws 6 with servo motors 4 and load cells 8, as one would view the system 300 prior to connecting the die top 31 to the silicone seal 40 and prior to actuating the platen 14 and the strongback 2 into intimate contact with the die top 31.

FIG. 1B illustrates the die cavity gap 47 at an exit end of the thermoplastic pultrusion die system 300. Once the die top 31 is bolted to the die bottom 30 at the bolt holes 45 shown on each the left and right hand sides of the die, then the die cavity gap 47 will be a closed cavity, but for the opening at the entrance of the die (not shown) and the opening at the exit (shown as 47 in FIG. 1B).

An important aspect of the system 300 is the two pieces of silicone seal material shown as 40 on both sides of the system 300. Although the silicone seals 40 are shown as narrow, elongated strips of silicone material, in alternative embodiments, the silicone seals 40 may be any shape/configuration. For example, but not by way of limitation, the silicone seals 40 may be round and fit into somewhat circular slots of matting flanges of both die bottom 30 and die top 31. The bolts holding the die bottom 30 and the die top 31 together would pinch the silicone seal 40. In the embodiment shown, a thread is disposed in die bottom 30 and a slip fit in die top 31. The bolts can be tightened to give a maximum die cavity gap position and no more. The minimum die cavity position is attained by actuating the platen 14, which is shown raised above the die top 31, but would be brought down into intimate contact by way of the actuated ball screws 6 that are shown on each side of the thermoplastic pultrusion die system 300. Although only two ball screws 6 are shown in FIG. 1B, the thermoplastic pultrusion die system 300 may include 4 or more actuated ball screws 6.

The platen 14 is attached to the bottom of the strongback 2, which allows for a steady and well distributed downward force on the top of the thermoplastic pultrusion die system 300 when the ball screws 6 are actuated downward by the servo motors 4. The servo motors 4 are controlled by a CNC control system that command(s) a given position through sophisticated motion control including, but not limited to, commanded acceleration, deceleration, and soft reversal of torque and direction. When the downward force of the platen 14 depresses the silicone seals 40, there is additional resistance of the thermoplastic tape material, which is not shown in FIG. 1B for clarity, but would be in the entire die cavity gap 47. Since the silicone seals 40 are designed for high temperature and have good recovery after compression, the die cavity gap 47 remains sealed on the sides through the entire actuation cycle from maximum gap to minimum gap. The silicone seals 40 can stretch or be compressed up to 800% without loosing its/their elasticity.

Although the maximum die cavity gap 47 can be set by the bolts (in bolt holds 45), a more preferred method is the use of the load cells 8 at the end of ball screws 6 to give a measure of calibrated die pressure. If the weight of the die top 31 is great, it may be necessary in some cases to attach the die top 31 to the platen 14 and the strongback 2. In this way, absolute minimum material pressure can be achieved when the ball screws 6 are actuated upward. The goal will be to adjust the die cavity gap 47 to the proper height to achieve continuous pultrusion of thermoplastic composite laminates, and when the situation calls for it, the system 300 can actively alternate between pultrusion and cycling the die cavity gap 47, as well be described in more detail below.

Although the lower support 18 is shown as being fixed and secured to ground/not deflectable, in one or more alternative embodiments, the support 18 is similar to the platen 14 and the strongback 2. Thus, in one or more embodiments, the system 300 may include an upper movable die top/platen/strongback and/or a lower movable die top/platen/strongback.

Purposely not shown in FIG. 1B are the heating and cooling systems (they can generally be seen in FIG. 1A), which include a heating zone in the center and generally forward sections of the system 300, top and bottom, and with a cooling section toward the rear, or discharge end of the die, both top and bottom. Multiple coordinated controls may be used to control the system 300. If, for example, the system 300 of FIG. 1B had four ball screws 6 with four servo motors 4, the system 300 would include 4-axes of motion control. With the addition of three pultrusion grippers (See FIG. 1A), the system 300 would include a minimum of a 7-axis CNC system and process. The computer hardware and/or software to interface with this system 300 will be generally described below with respect to the exemplary computer system 550 described below with respect to FIG. 11.

Once the embodiment of FIG. 1A is provided as a system 300, with the CNC motion control, then the control schemes of FIGS. 2, 3, 4, and 5 can be implemented. There are reasons to consider each, which will depend on factors, such as, but not limited to, laminate thickness, laminate density, surface finish required, addition of foreign material (besides thermoplastic tape) including the wide variety of core materials such as, but not limited to, wood, concrete, gypsum, honeycomb, foam, and other foreign materials/cores that can be found in sandwich panel construction.

Figure 2:
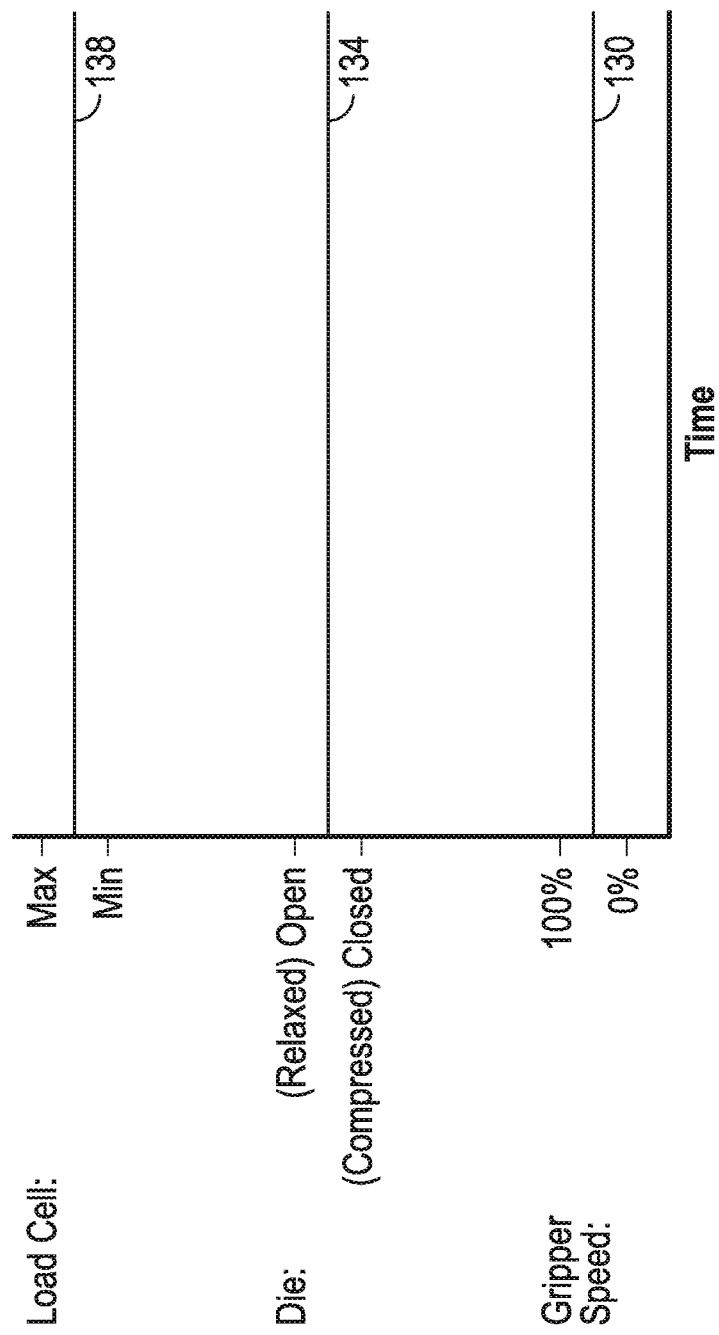
FIG. 2 is a graph showing how the embodiment of the thermoplastic pultrusion die system and method shown in FIG. 1B can operate steady state at some predefined load cell reading, which is a closed loop control and feedback on the opening of the die cavity gap, and synchronized with the pultrusion speed.

FIG. 2 shows the simplest control scheme for the system 300. Three different graphs are shown versus time. The units in time can be any as part of the pultrusion process. As shown in FIG. 2, the grippers 309, 311, 313 are shown running at a consistent speed 130 somewhere between their 100% design speed and 0% speed (stopped). The die cavity gap 47 is shown between some maximum specification gap and some minimum specification gap 134. The load cell reading 138 is showing an effective internal pressure via a constant load cell reading. This is similar to thermoplastic tape pultrusions run consistently with thick parts (0.303 inches in thickness and 32 layers of Polystrand thermoplastic tape). In such a case, the die thickness that was machined was perfect. However, had it not been perfect, the frictional forces would have been too high or the consolidation would have been too low. In cases where the die is not perfectly set to the correct die cavity gap, then the system 300 and method of the present invention can correct such a problem.

In the case of thin laminates, the adjustment of die cavity gap may be mandatory in achieving a perfect pultrusion. FIG. 2 simulates setting the die cavity gap to the perfect thickness, as judged by numerous criteria, as if a solid die was perfectly manufactured. The system 300 of the present invention is critical in reducing the costs of manufacturing and trial and error in making the perfect die. Accordingly, FIG. 2 represents a system that duplicates a perfect die cavity gap, and has an important other benefit. In start-up, it is necessary to open the cavity somewhat to make it easier to string-up the material at the start. Also, if splices ever are needed such as at the end of a pultrusion run, the pultrusion die system 300 can be slightly opened temporarily. If an anomaly occurs, the control system would catch the problem (such as the tape breaking at the inlet and suddenly having less volume). In this case, the load cell 8 on the die top 31 would catch a drop in consolidation pressures.

Figure 3:
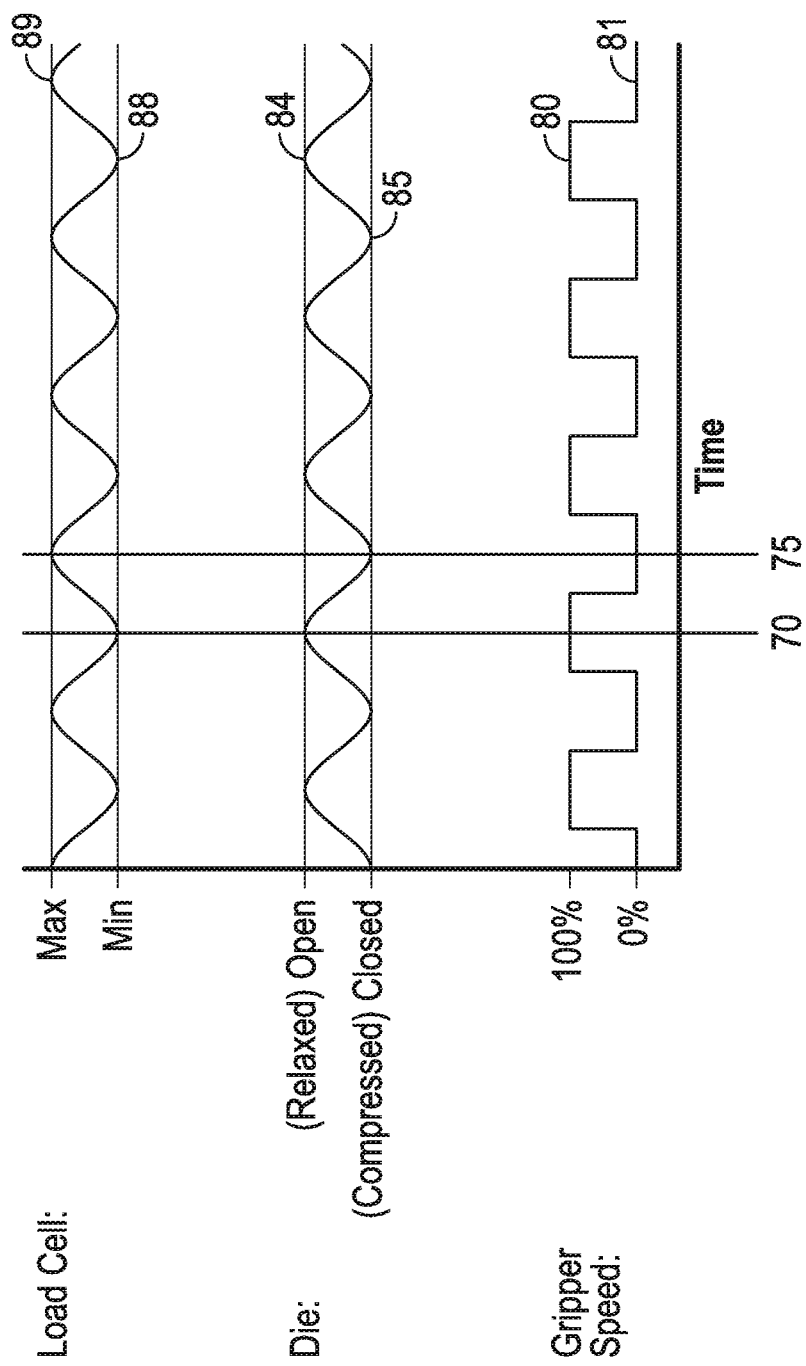
FIG. 3 is a graph similar to FIG. 2 in which a further embodiment is possible with the thermoplastic pultrusion die system and method. In this embodiment, the thermoplastic pultrusion die system and method allow for temporary halting of the gripper speed while high-compression forces are temporarily applied to the part.

FIG. 3 shows a variation in software control that can be provided with the identical system described with respect to FIG. 1. With thin laminates, it is sometimes necessary to prevent the sloughing of off-axis tapes, such as +/−30 degrees, +/−45 degrees, or 90 degrees. This sloughing is caused by tight die cavity gaps, minimum material and high frictional forces. The graph of FIG. 3 is similar to FIG. 2. The term "pull-pression" is coined for the combination of pultrusion and compression (molding). It should be noted that two different moments in time are shown with the vertical lines 70 and 75.

Line 70 in FIG. 3 shows a point in time where the gripper 309, 311, 313 is pulling at 100% of design speed, indicated by 80. It is here where the die cavity gap 47 is most open or relaxed, as indicated by the peak in the curve 84. It so happens that the load cells 8 reading the die pressure will be at their lowest point 88.

As the grippers 309, 311, 313 move in a cycle, new raw material 304 is being pulled into the entrance of the pultrusion die system 300 and the finished composite part 302 is being pulled from the exit of the pultrusion die system 300. After a discrete unit of time, the grippers 309, 311, 313 suddenly stop and this occurs when the servo actuators apply commanded downward force on the die top 31 and the part is effectively undergoing compression. At this point, the grippers 309, 311, 313 are stopped at 0% speed 81 and the die cavity is compressed at cycle point 85 and the load cell(s) 8 indicate maximum compression 89.

It is at this point that the cycle repeats itself. At intervals, the material is in a relaxed condition and pulled into the pultrusion die system 300, then compressed at no speed, and then relaxed at 100% speed, and the process repeats itself. The pultrusion die system 300 starts out cold at the front (or partially heated below the melt point of the thermoplastic matrix). As the material moves its way down the pultrusion die system 300, it encounters a hot zone designed to completely melt and consolidate the part under pressure, and then further down towards the die exit, the material is chilled or cooled and it is finished with its consolidation and eventually exits the cooled die as a finished section.

Figure 4:
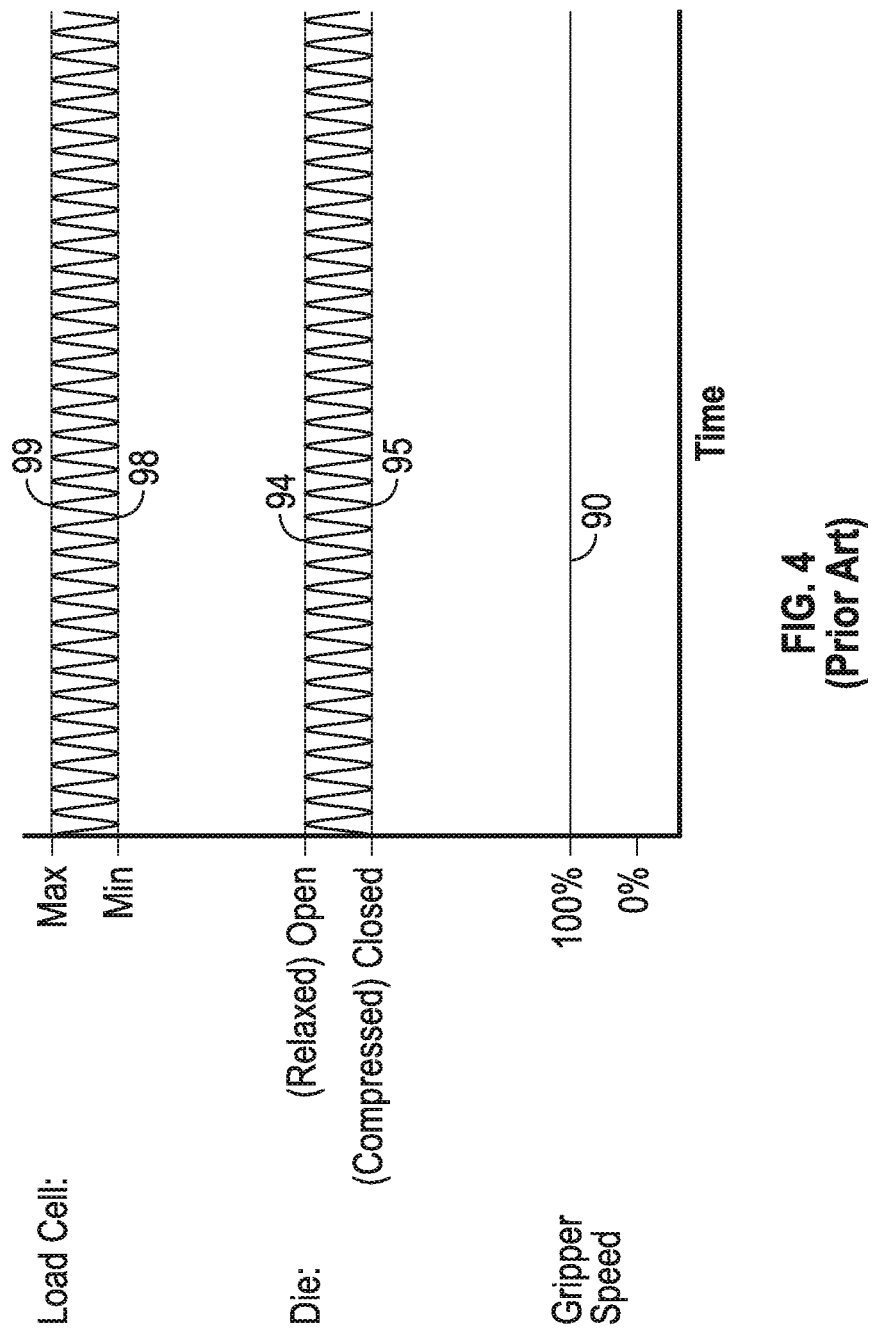
FIG. 4 is a graph similar to FIG. 3, except that in this embodiment of the thermoplastic pultrusion die system and method a rapid servo control and high frequency of the change in die cavity gap occurs in a manner that does not require the grippers to be stopped.

FIG. 4 is similar to FIG. 3. It should be noted that, in FIG. 4, there are peak load cell readings 99 associated with the most compressed die locations 95. Likewise, there are minimum load cell readings 98 that correspond to relaxed positions on the die gap 94. Shown in FIG. 4 is a very high cyclic alternate actuation of servo controls to achieve this rapid movement and the numbers could amount to several per second, with the limitations of the actuation system and the ball screw travel. In this case, a small fraction of time allows the pultrusion speed to stay constant and follow steady pultrusion speed. Using the system 300 and method, trial and error can be used to determine the optimum control sequence.

Figure 5:
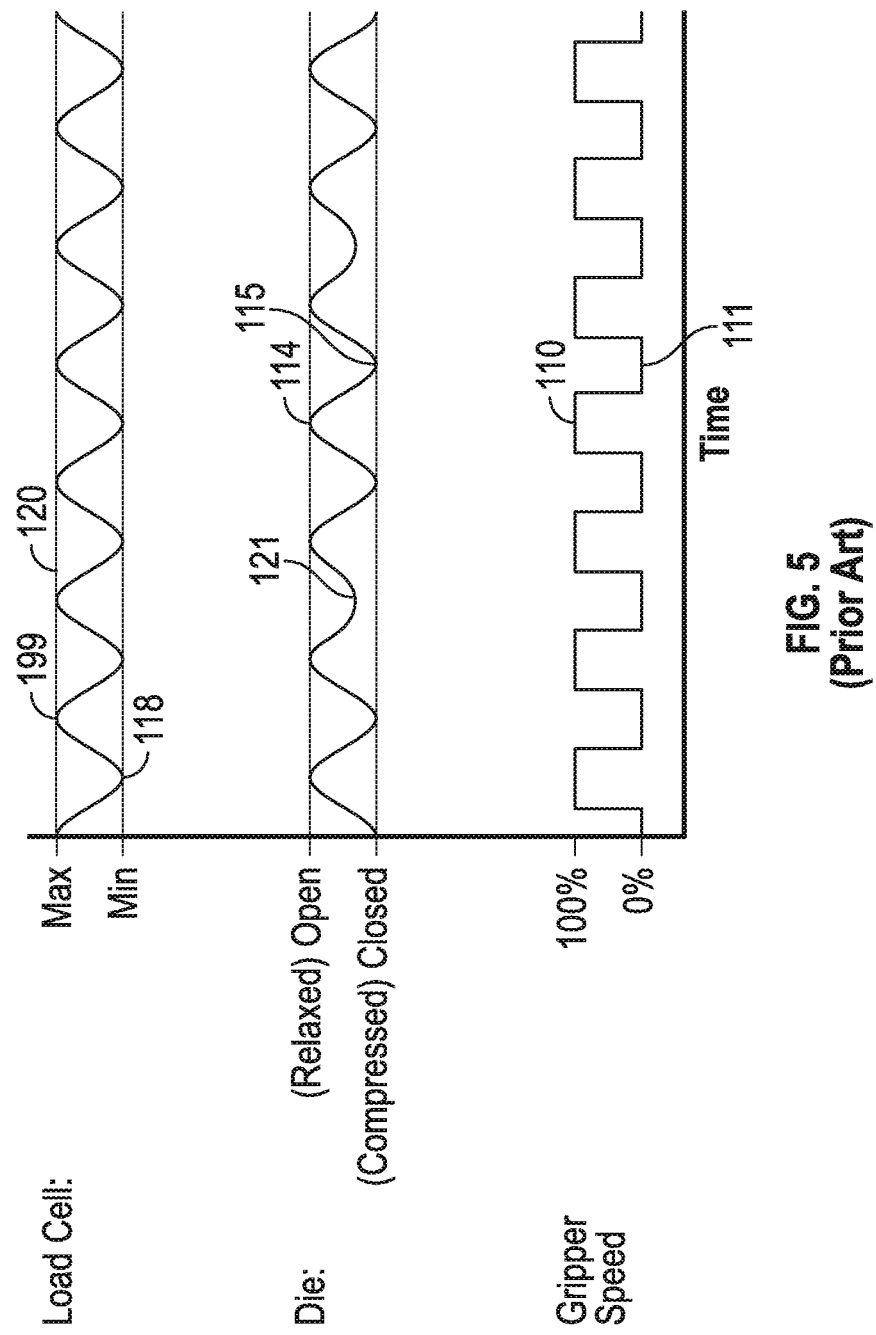
FIG. 5 is a graph similar to FIG. 3, and shows how the thermoplastic pultrusion die system and method could react to an anomaly such as a splice, a knot in a wood core, or other disruption causing excessive die pressures.

FIG. 5 is similar to FIG. 3, except in FIG. 5 the control interrupts a compression event 121 when some interference (e.g., a thicker core or skin material) has entered the pultrusion die system 300 and now the full compressed location 115 of the die cavity cannot be achieved as the load cell reading alarms the control system that maximum die pressure has occurred early in the compression cycle. In this case, the actuators will not complete the compression until the load has returned to an acceptable level.

Figure 6:
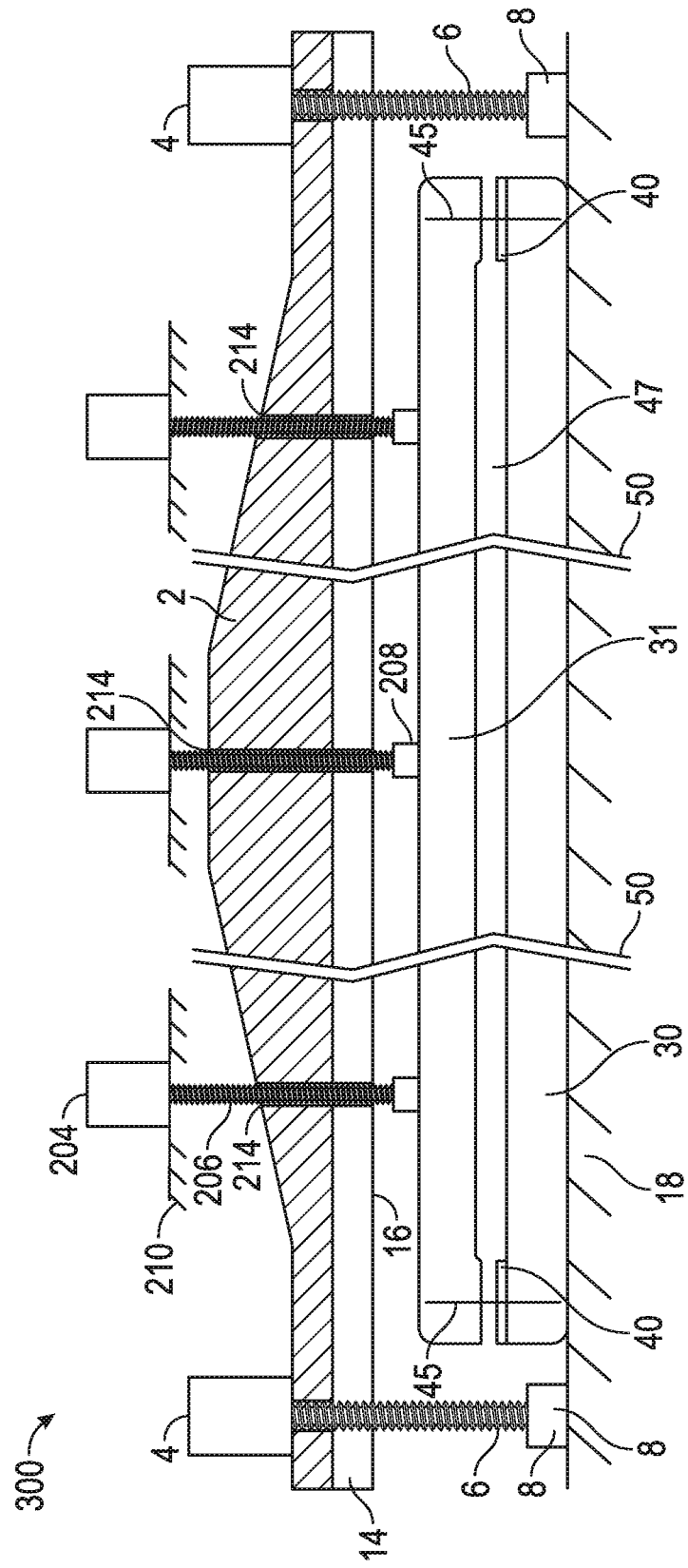
FIG. 6 is a side elevation view similar to FIG. 1B of an alternative embodiment of a thermoplastic pultrusion die system and method with multiple CNC type servo actuators and load cells installed over a very wide die top, a very wide plate, and a very wide strongback.

In many large pultrusion die systems, producing panels continuously and up to as much as 14 feet in width, it is difficult to pressure the material and keep the die surfaces at the same gap in the middle of the pultrusion die system 300 as the edges. In this case, as shown in FIG. 6, the lines 50 are break lines and indicate a much wider die than shown. A sample of an adjunct ball screw 206, load cell 208, and servo motor 204 are shown. This is shown inside a hole 214 which has been placed in the strongback, 2 and the plate 14. For a very wide pultrusion die system 300, there may be several of these placed every 1, 2, 3, or 4 feet (or other distance) apart across the width of the pultrusion die system 300 and these are there to achieve the same purpose as elements 4, 6, and 8 in FIG. 6. These multiple actuators could allow for controlling die cavity gaps in the center of a wide, flat die, in which any pressure would want to slightly open up the gap, due to hoop stress forces. There is a need for active CNC control of the die cavity gap 47 over the entire panel width, and this will be especially important in thin and wide thermoplastic composites manufactured from the tapes described herein.

Figure 7:
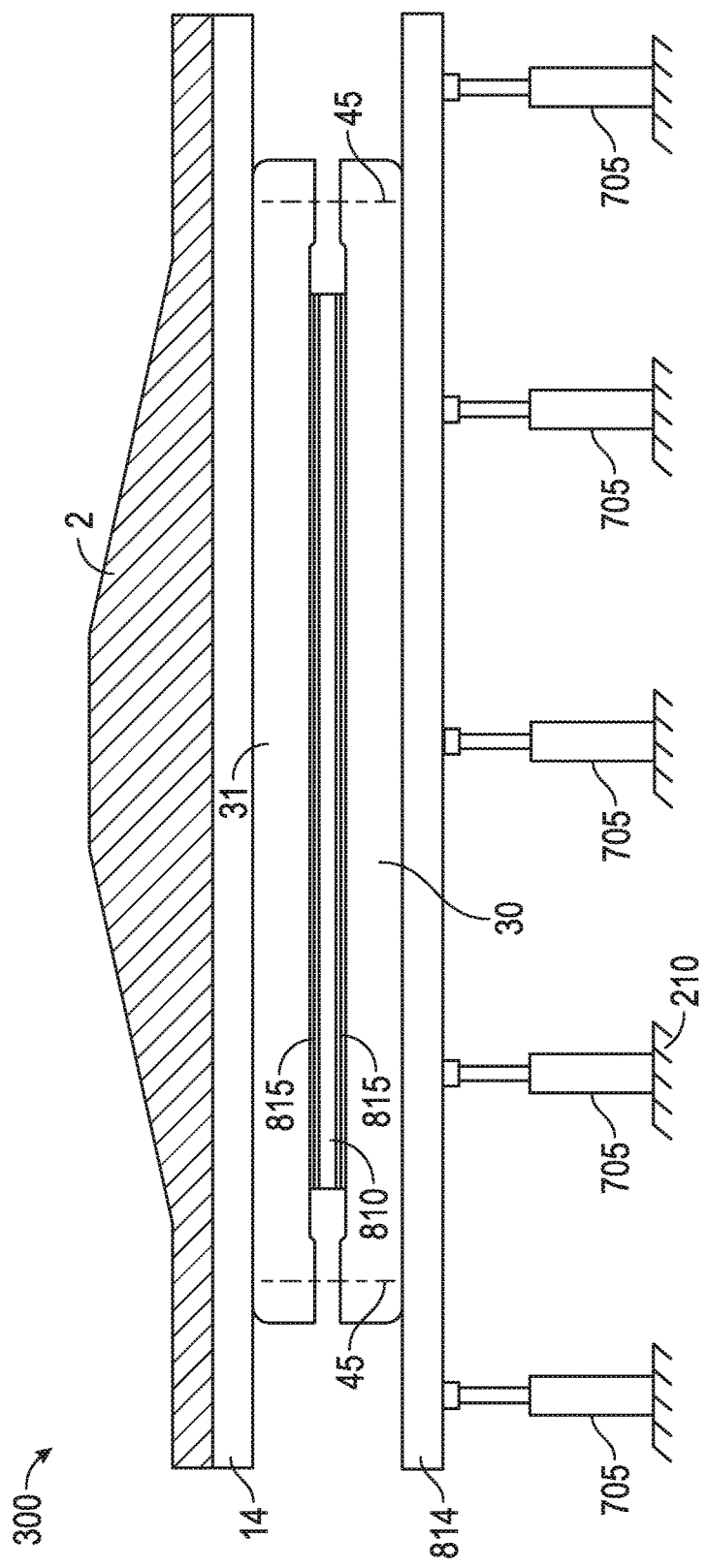
FIG. 7 is a side elevation view similar to FIG. 6 of an alternative embodiment of a thermoplastic pultrusion die system and method, except that the CNC motors and actuators have been replaced with servo CNC hydraulic cylinders and a sandwich panel is shown.

FIG. 7 is a side elevation view similar to FIG. 6 of an alternative embodiment of a thermoplastic pultrusion die system and method, except that the CNC motors and actuators have been replaced with servo CNC hydraulic cylinders 705. Also shown is a sandwich panel in a compressed state, with skins 815 and core 810, in the compressed state as if the full design pressure had been applied through the cylinders 705.

The servo-controlled hydraulic cylinders 705 can alternately close and open the die cavity. When closing, the die cavity can move to a position in which a given pressure is applied to the composite materials, which if, for example, a 100 psi pressure is required and if cylinder(s) 705 were incorporated into a centers-of-equal area, then one square foot, or 144 square inches, requiring 100 psi, would mean a 4 inch diameter cylinder 705 would operate at 1146.5 psi operating pressure. In other words, a single 4-inch cylinder 705 has 12.56 square inches of area, and at 1146.5 psi will deliver 14400 lbs., which is exactly 100 psi of laminate die pressure over one square foot. Further to FIG. 7, the hydraulic cylinders 705 are intended to supply force at the centers-of-equal area. As indicated above, the strong-back 2 supports the upper platen 14, wherein the lower platen 814 has hydraulic cylinders 705 pressing on same and reacted by the ground 210. The die top 31 and die bottom 30 are shown in a compressed state, and as shown there is no need for bolts 45 to attach to the die upper and lower sections.

Figure 8:
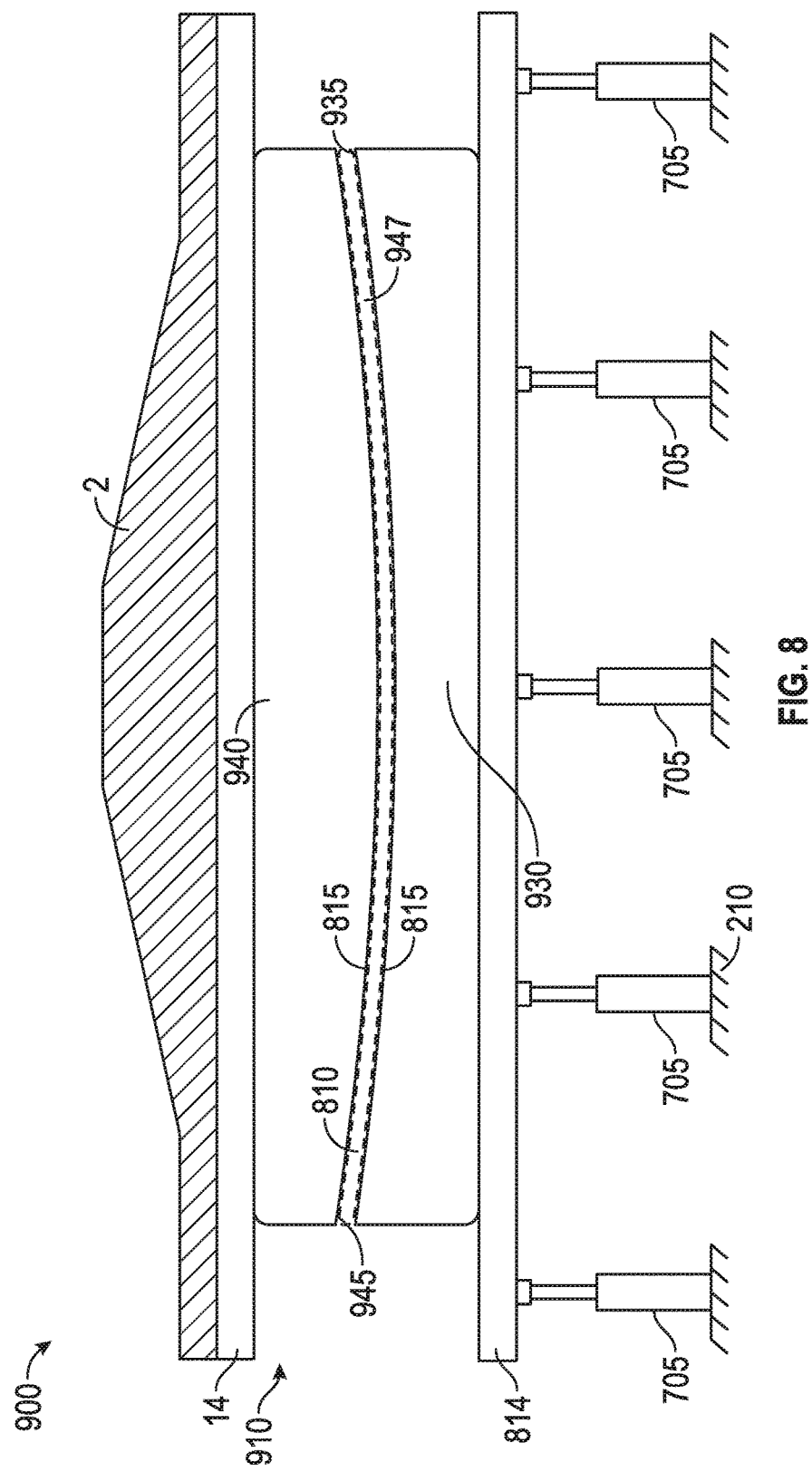
FIG. 8 is a side elevation view similar to FIG. 7 of a further embodiment of a thermoplastic pultrusion die system and method, except that the interior of the die is spherically curved.

FIG. 8 is a side elevation view similar to FIG. 7 of an alternative embodiment of a thermoplastic pultrusion die system 900 and method. The view of thermoplastic pultrusion die system 900 in FIG. 8 is of the exit of the die system 900, but a side view would show the same spherical shape (i.e., die system 900 has interior spherical curve in both longitudinal and lateral directions of die system 900, which manifests itself as an arc line when viewed, as in the case of FIG. 8 at just one edge of the spherical die) and, thus, look similar to that shown in FIG. 8. The above description and drawings of the thermoplastic pultrusion die systems and methods with respect to FIGS. 1-7 are incorporated herein and like elements are shown with like reference numbers.

Figure 9:
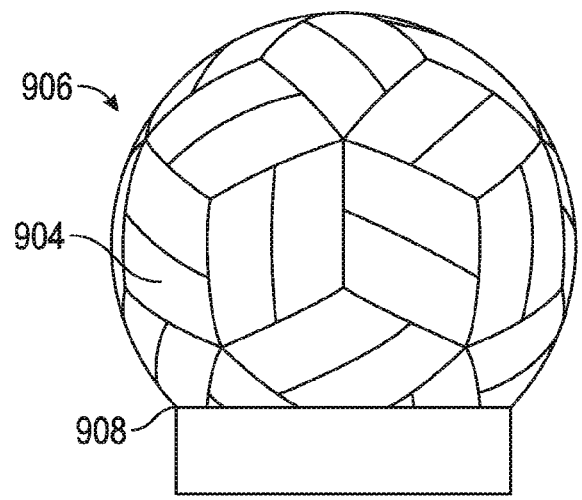
FIG. 9 is a perspective view of an embodiment of a rhombic triacontahedron composite radome.
Figure 10A:
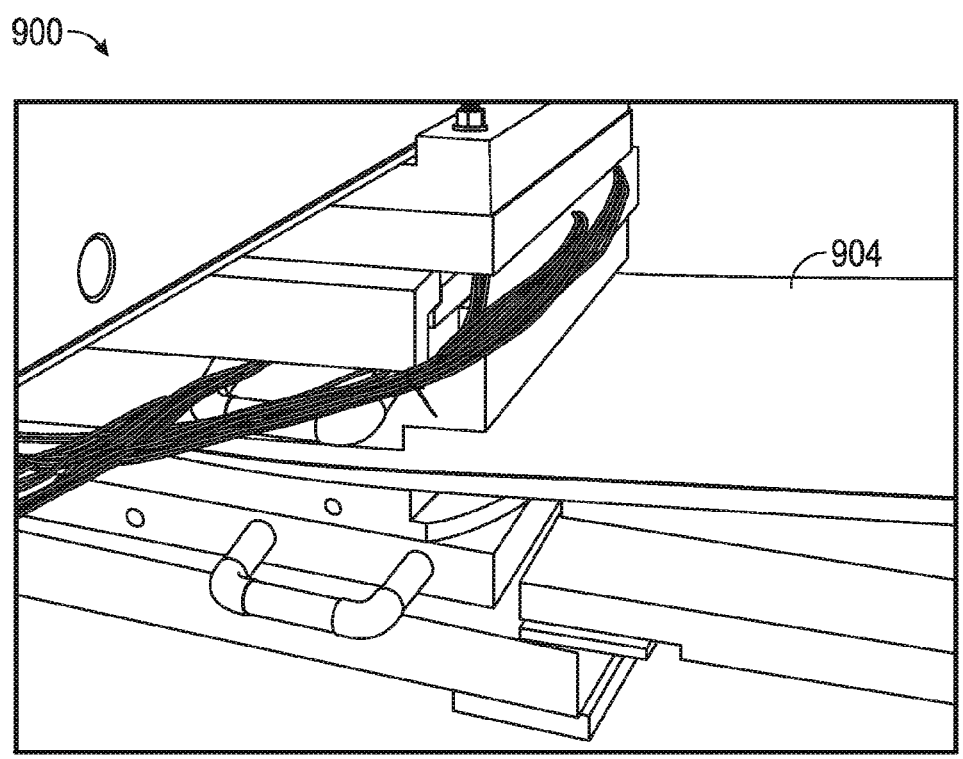
FIGS. 10A-10E are perspective views of different stages of spherical thermoplastic composite sandwich panels processed in a small spherical die similar to that as shown in FIG. 8 and exiting the die along the defined spherical path into curved spherical composite sandwich panels using the thermoplastic pultrusion die system of FIG. 8.
Figure 10B:
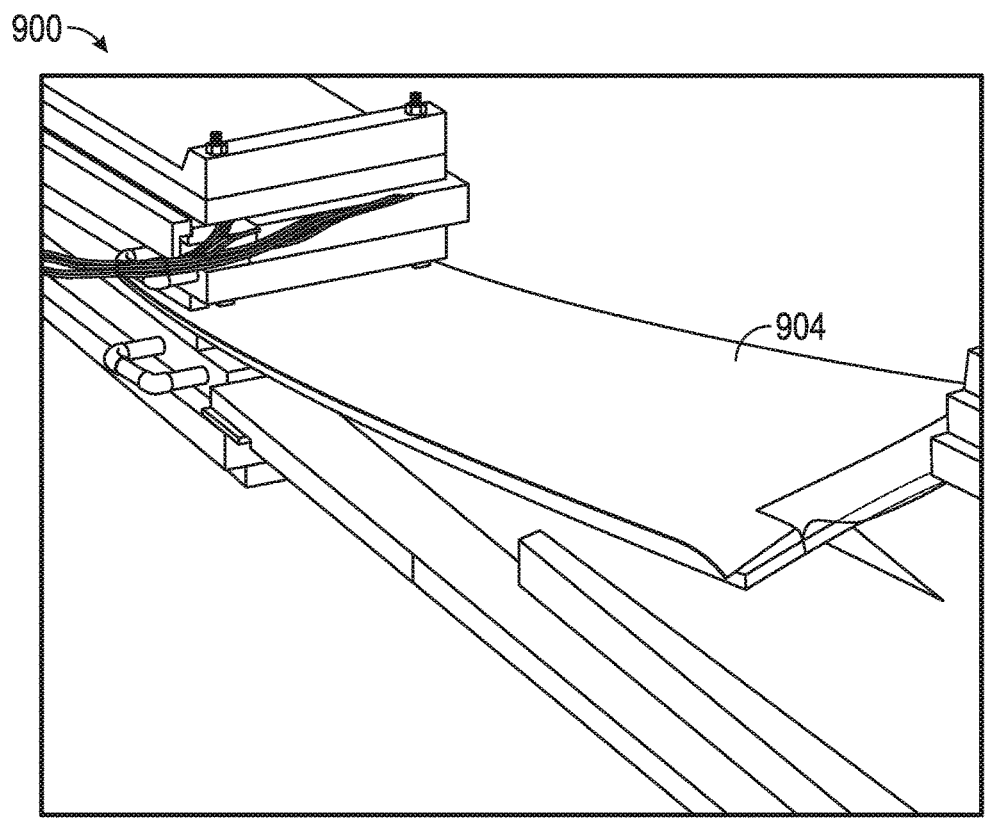
Figure 10C:
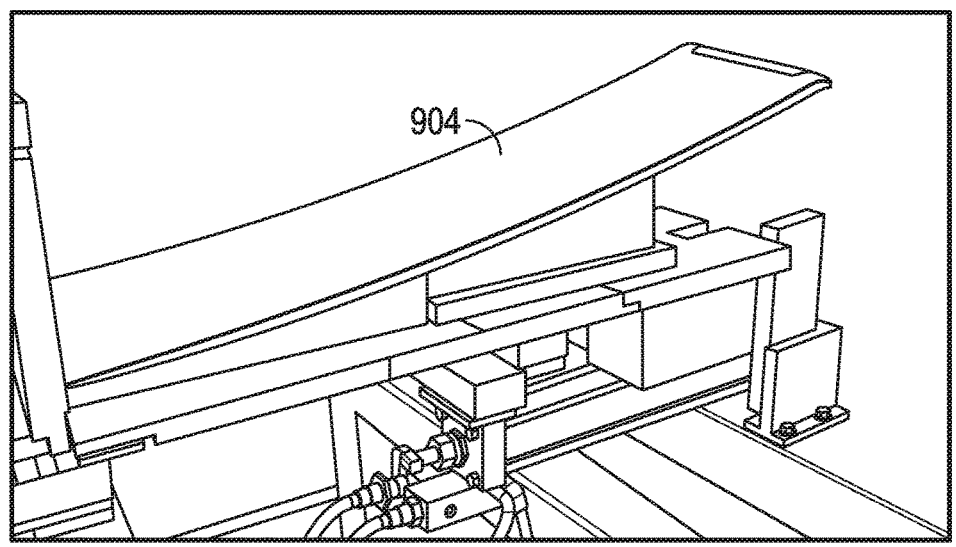
Figure 10D:
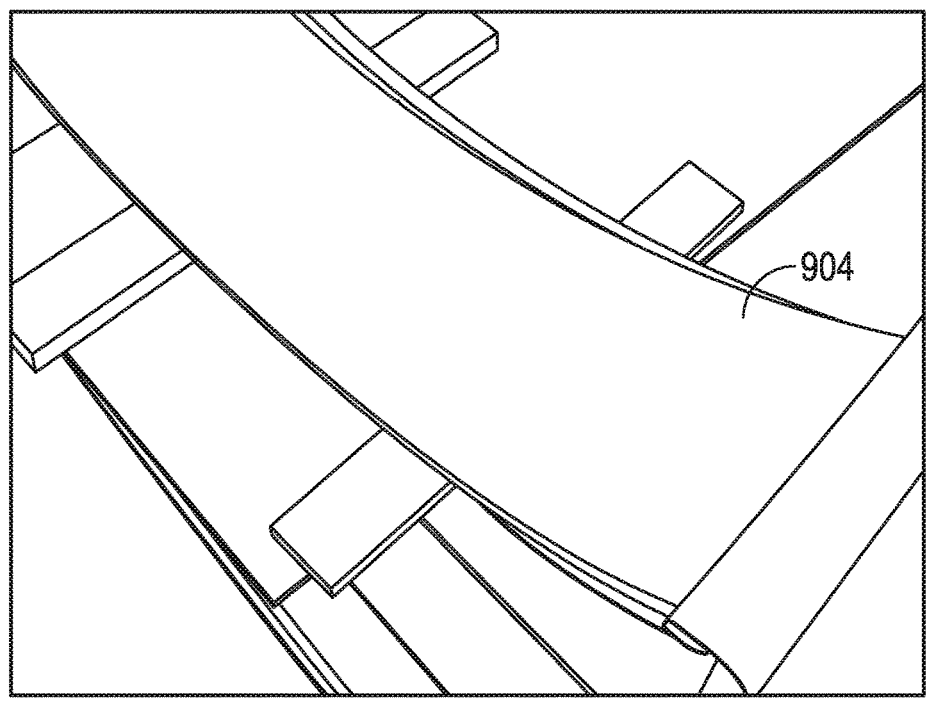
Figure 10E:
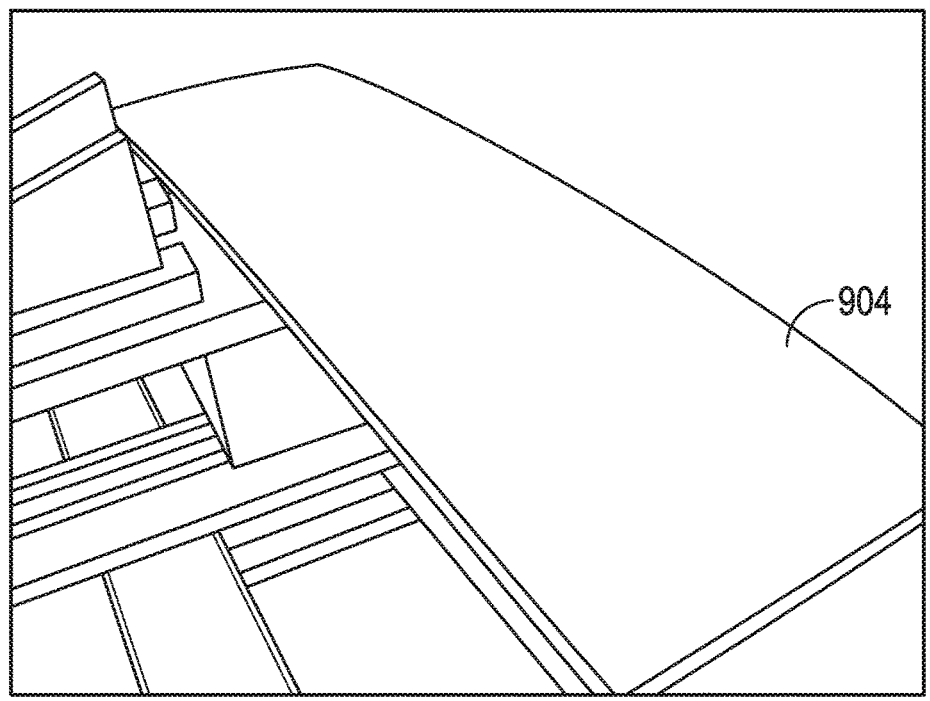

In the embodiment shown, the thermoplastic pultrusion die system 900 and method are used to sequentially form from the input into the processing die of flat thermoplastic composite sandwich panel material into 100% spherical-curved sandwich panels 904 that exit the processing die, which are assembled together to form a rhombic triacontahedron composite radome 906 such as that shown in FIG. 9 to protect a vast number of radar installalations, including military radar. The flat sandwich panels include a foam core with top and bottom skins and as an option, 3-dimensional fibers transit from one skin to the other, through the foam. In alternative embodiments or implementations, the thermoplastic pultrusion die system 900 and method are used to post mold sandwich panels for other applications, including panels of different spherical diameters and different cylindrical shapes, as well as complex curvatures.

The thermoplastic pultrusion die system 900 includes a spherically curved die 910 in the shape of the defined spherical diameter of rhombic triacontahedron radome panels 906. The die 910 includes a die bottom 930 with a curved, spherical, concave top surface 935 and die top 940 with a curved, spherical, convex bottom surface 945. Together, the curved, concave top surface 935 of the die bottom 930 and the curved, convex bottom surface 945 of the die top 940 form a curved spherical die cavity gap 947.

As shown in FIGS. 10A-10D, during the efficient in-line thermoplastic pultrusion method, the flat sandwich composite panels are processed into continuous curved, spherical sandwich composite panel parts 904. The curved sandwich composite panel parts 904 exiting the die system 900 climb according to the curvature being formed. In the embodiment shown, the curved sandwich composite panel parts 904 are of the same length, size, and curvature and are assembled together to make the radome 906 to protect military radar. In alternative embodiments, it may be desirable to make curved configurations/structures where one of more of the curved panels have a different curvature, length, and/or size. In a still further embodiment, the convex and concave surfaces and die members are reversed, such that the spherical resultant panel exiting the die members curves in a downward direction.

With reference to FIG. 9, the rhombic triacontahedron composite radome 906 is a sandwich panel radome of the A-Sandwich variety wherein the thin skins on each side are a thermoplastic resin matrix with glass encapsulating a foam core, and the combination of the thin skins and the foam core are radio frequency (RF) transparent and sized to be approximately ¼ the wavelength of the radar frequency of the military radar being protected. The radome 906 is made of spherical panels 904 and is of the order of 30 feet to 60 feet in diameter, but clearly could be any diameter from 5 feet to 200 feet in dimension. Because the radome 906 is a rhombic tricontrahedron radome, there is only one-sized panel to make the sphere. Because the radome 906 is a rhombic triacontahedron radome, there is only one-sized panel to make the sphere, excluding the truncated panels that attach to a mounting ring or foundation, at 908, and each said truncated panel is made from a larger, aforementioned one-sized panel.

Hydrophobic films or coatings/paints can be applied to the outside of the radome sandwich part 904 prior to assembly to resist weathering and to keep the radome 906 clean and free of water droplets, in order to affect the superior transmission capability of the radar.

To house the radome 906, there is a truncation of the dome, at approximately 85% of the height/diameter of the radome 906, where a mounting ring 908 is located and the radome 906 bolts, or is fastened, to the mounting ring 908 for structural stiffness and rigidity, and here there is a set of different shaped panels, but each formed from the same base-singular panel 904, to create the spherical radome 906. In an alternative embodiment, the radome 906 is made of panels 904 having a few different configurations of a multitude of geodesic designs involving radome shapes, pentagons, hexagons, radome-shapes, oranger-peel shapes, and the like.

Figure 11:
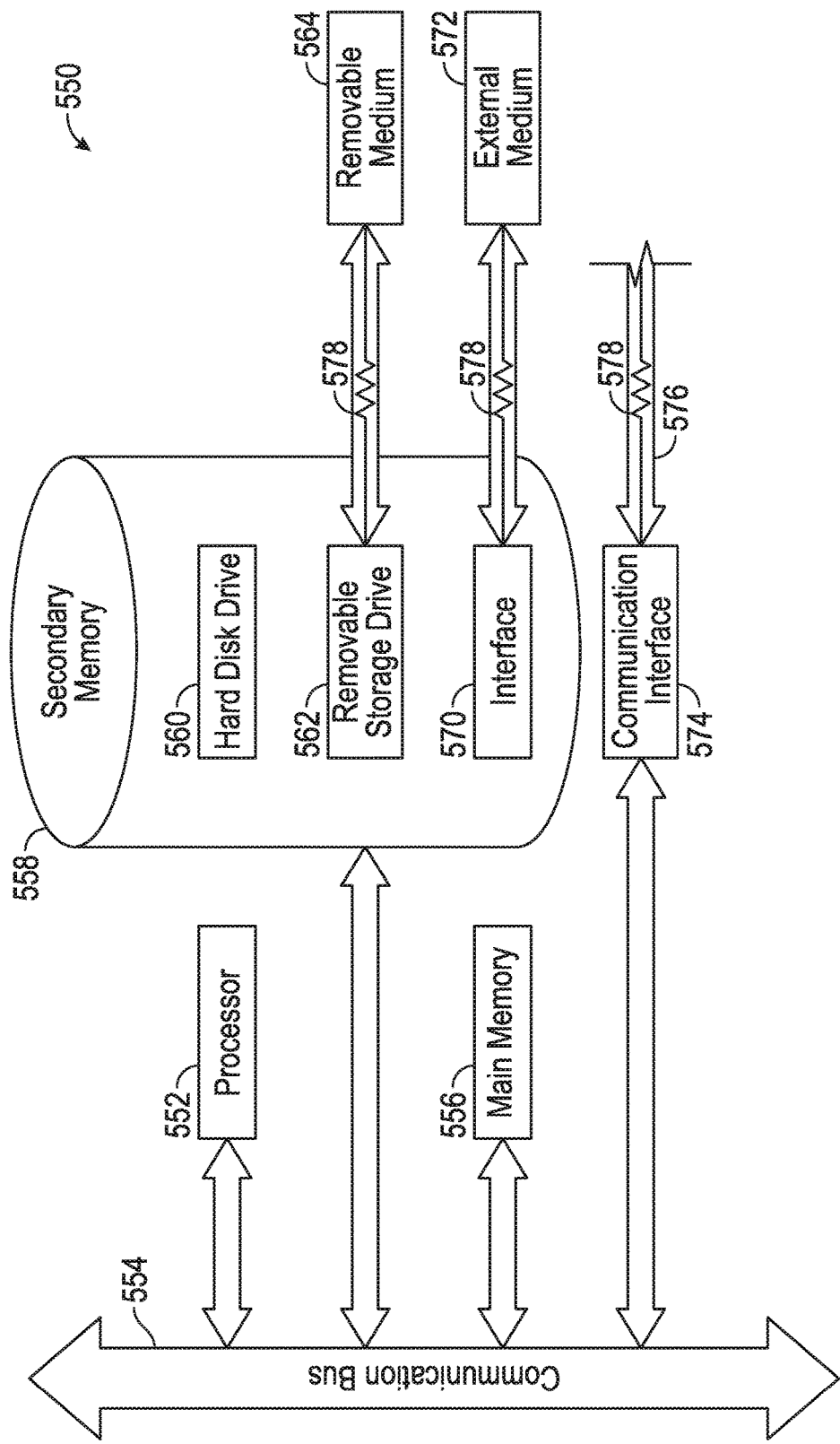
FIG. 11 is a block diagram illustrating an example computer system that may be used in connection with various embodiments described herein.
Figure 12:
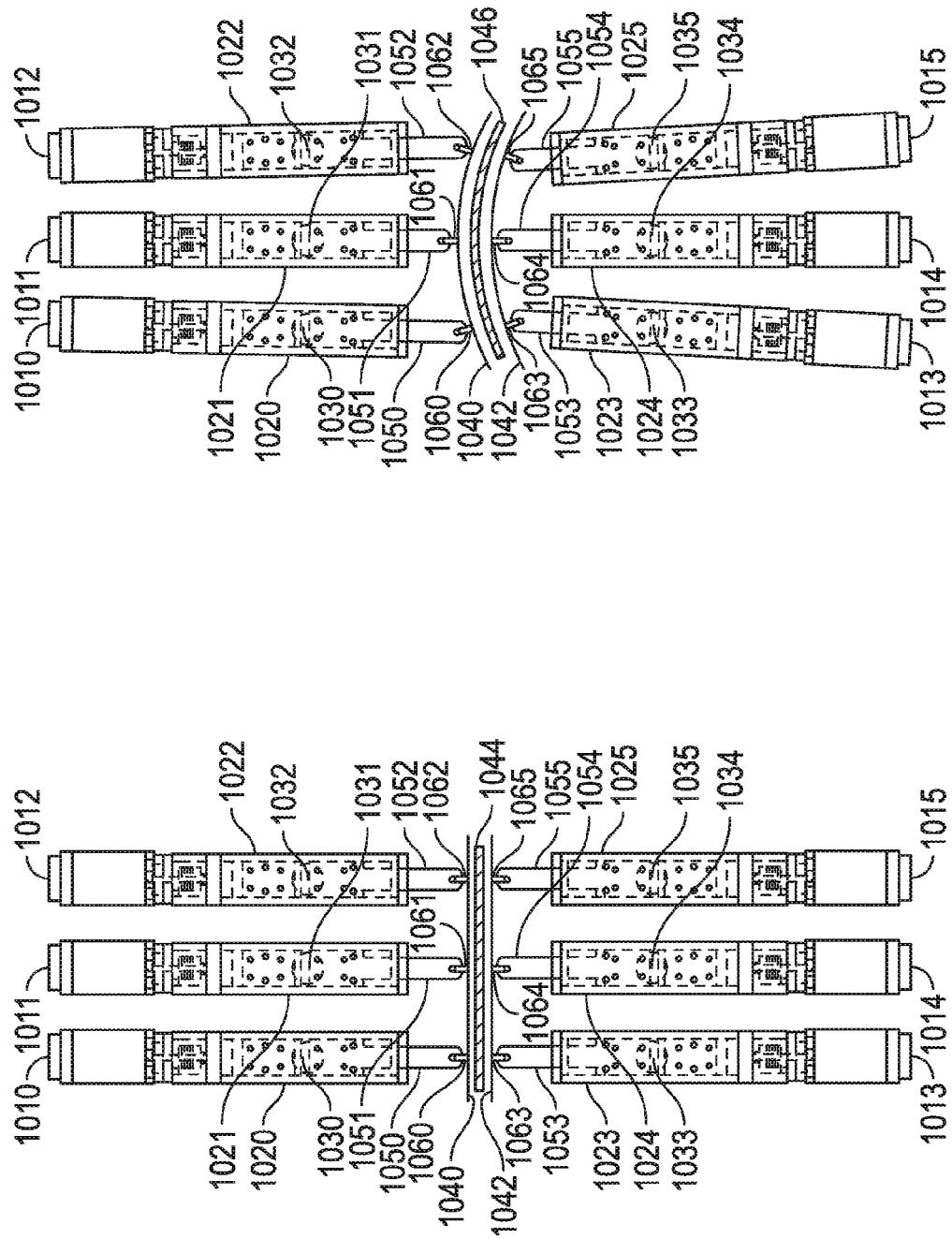
FIG. 12A shows an embodiment of a 3D thermoplastic forming machine.
FIG. 12B shows the 3D thermoplastic forming machine of FIG. 12A with bands retracted and the thermoplastic prepreg material shown in a somewhat arched shape.

FIG. 11 is a block diagram illustrating an example computer system 550 that may be used in connection with various embodiments described herein. For example, the computer system 550 may be used in conjunction with the computer system(s), computer(s), control(s), controller(s), control system (e.g., software, and/or hardware). However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

With reference to FIGS. 12A-14, an embodiment of a 3D thermoplastic pultrusion forming machine/apparatus and method will be described.

Thermoplastic composite processing can be accomplished continuously by incrementally applying die pressure on preformed and prepreg material while the part is not moving through the machine, then sequentially altering between a release of the die surfaces/and movement-to-open-die-surfaces, then a movement in a controlled fashion an incremental step forward, followed again by zero line speed and a clamping force applied.

This can be seen by examining FIG. 3, showing clamping and line speed alternating as the continuous process proceeds. The part then moves from a heated die at predetermined temperatures to a chilled die also at pre determined temperatures, and then when exiting the chilled die the part is fully consolidated.

Replacing the die, which initially is flat, as shown and described with respect to FIGS. 1B, 6, and 7, with a spherical or cylindrical die, as shown and described with respect to FIG. 8, one can make curved shapes continuously. A 32-foot diameter radome with thermoplastic sandwich panels manufactured in the process system described above was successfully manufactured and installed.

Applicant has recognized that a need exists to manufacture a complex shape that has varying contours, such as a propeller for a small airplane. This is not a flat panel, a spherical panel or a pure cylindrical panel, and the shape of the propeller is a complex curvature surface that the state of the art would dictate a mold be produced and the material either vacuum bag-produced, or match mold produced, or the like. Applicant has also recognized that a need exists to produce a complex shape from the continuous system the Applicant has developed.

Similar to the embodiments shown herein and described above, where a thermoplastic composite prepreg or the like is sequentially consolidated at a "melt" temperature as the part is pulled forward, the 3D thermoplastic pultrusion system and method includes a thermoplastic composite prepreg or the like that is sequentially consolidated at a "melt" temperature as the part is pulled forward, but, at the exit of the heated section of the die, as the chilled section is entered, the chilled section of the die is replaced with a new CNC actuated band that varies the lateral contour of the part as it exits the entire die. This very small and incremental die shape can be changed, both top and bottom, by computer code implemented by a computer system (e.g., computer system 550 shown in FIG. 11) that commands actuators to change the shape of these chilled pressing bands, gradually and incrementally.

With reference to FIGS. 12A to 14, an embodiment of the 3D thermoplastic pultrusion system and method will now be described in more detail. The 3D thermoplastic pultrusion system and method allows any complex shape to be produced continuously without the need for expensive dies and net-shape-molds, in automotive industries it will be possible to continuously manufacture complex body panels such as doors and hoods; in the aerospace industry one can manufacture aircraft body panels, luggage compartments and airplane interior sections; and in the industrial markets, one can now manufacture any component that currently requires a large mold, including complex piping and duct-work.

The 3D thermoplastic pultrusion system and method may include the system shown in FIG. 1A, where heating occurs at the front section and chilling occurs at the rear section, but the 3D thermoplastic pultrusion system and method has only heating and adds a new component of CNC equipment, as shown in FIG. 12A, that is placed and positioned just downstream of the heated die. The thermoplastic composite section has been thoroughly consolidated, worked and pressed, and is now ready to be chilled into a final shape. As the shape enters the device of FIG. 12A, the following takes place:

CNC actuators and motors are positioned with a motion control program to extend, or retract actuators with an accuracy of +/−0.001 inches;

these actuators are connected through a swivel joint to a chilled band;

the band has the ability to flex and contour as multiple actuators are commanded to specific locations;

the chilled band can consolidate the hot prepreg thermoplastic composite material into a specific shape for each small increment of material advancement;

below the prepreg composite material is a similar set of motion control motors and actuators, along with a similar chilled band;

now an inside and outside shape can be defined and the chilled bands can take the shape and additionally, pressure can be applied from the actuators such that the composite material is cooled and consolidated between the upper and lower bands.

Further description of this process will be described following a brief description of FIGS. 12A, 12B, 13 and 14.

In FIG. 12A, the 3D thermoplastic forming machine is shown. The upper chilled forming band 1040 and the lower chilled forming band 1042 are shown retracted from the thermoplastic prepreg material 1044. Although not shown, there may be a silicone release material between the bands and the composite to facilitate release and avoid sticking of the thermoplastic to the band material. Both upper chilled forming band 1040 and the lower chilled forming band 1042 are flexible. That is, they are rigid, yet flexible and can curve depending on the force that is supplied by actuators 1020, 1021, 1022, 1023, 1024, and 1025. The commanded position comes from a computer and motion control program implemented by a computer system (e.g., computer system 550 shown in FIG. 11) such that the servo motors 1010, 1011, 1012, 1013, 1014, and 1015 move the thrusting and retracting plates attached to the actuators and identified as 1050, 1051, 1052, 1053, 1054, and 1055.

Attached to these thrusting and retracting plates is a pivot linkage that is attached to the chilling bands. The upper chilling band 1040 has pivots 1060, 1061, and 1062 and the lower chilling band 1042 has pivots 1063, 1064, and 1065.

When the chilled bands for a large curved surface as commanded by the CNC program, a secondary pivot may be necessary that allows the actuators 1020, 1021, 1022, 1023, 1024, and 1025 to rotate. This accomplished by bearings, or the like shown as 1030, 1031, 1032, 1033, 1034, and 1035. In FIG. 12A, the chilled bands are shown in the retracted position. Additionally the source for chilling the bands, whether fluid cooling and transfer or air flow, is not shown for clarity. But there are numerous systems available to constantly remove heat from the bands and maintain a chilled temperature (in thermoplastics a "chilled" temperature may be as high as 180 degrees F., which in thermoplastics technology is "chilled").

FIG. 12B shows the bands 1040 and 1042 having been retracted, but note the thermoplastic prepreg material is now in a somewhat arched shape as defined by the CNC program. Note the pivots of 1060 and 1062 have rotated, as have the pivots 1063 and 1065. Additionally the actuator bearings show a rotation of the actuators at 1030 and 1032 as well as 1033 and 1035. The central actuators, 1021 and 1024 have not pivoted as they remain in a position that is midway on the arc of the material.

Shown in FIG. 12B is the arch of the prepreg composite identified as 1046. The significance of this can be realized when looking at FIG. 13. Note that the straight section of thermoplastic composite 1044 in FIG. 12A is shown as 1044 in FIG. 13, and the curved thermoplastic composite 1046 in FIG. 12B is shown as 1046 in FIG. 13.

Figure 13:
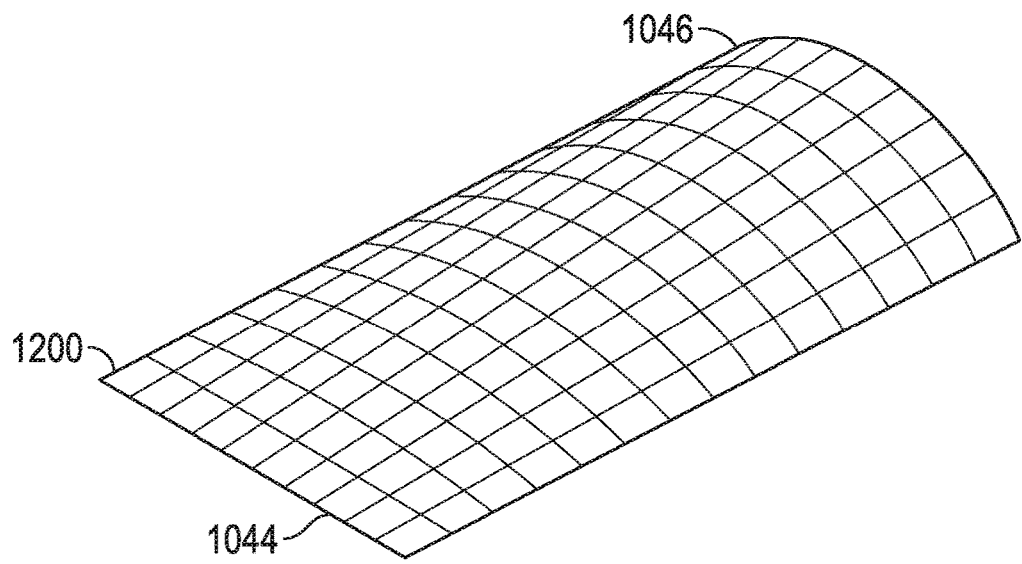
FIG. 13 shows a section of an embodiment of a thermoplastic composite resulting from the 3D thermoplastic composite pultrusion system and method.

Assume the composite part in FIG. 13 is 12 inches wide by 48 inches long. Note that the chilled composite of FIG. 13 is gradually curved from the flat section at 1044 to the curved section at 1046. This machine has incrementally formed this composite. As shown and described respect to FIG. 1A, the material is pulled by grippers a very short distance and the process is stopped incrementally to allow this CNC actuation. This advancement may be very small increments (as low as 0.005 inches or less). The finer the increments, the smoother the material. In fact, the chilled bands may be replaced with a small wire to consolidate and chill the thermoplastic over a very small length. In this way, the process is creating a truly 3D die shape that is continually changing in small increments.

Because the instantaneous chilling by the chilled bands defines the surface contour in the Y-direction (along the band and 90 degrees to the pultrusion direction), varying contours occur in the X-direction, or the pultrusion direction, by changing the CNC code for each incremental pulling in the pultrusion direction; the varying surface contour is in both directions, making a "compound" shape.

Now an inside and outside shape can be defined and the chilled bands can take the shape and additionally pressure can be applied from the actuators such that the composite material is cooled and consolidated between the upper and lower bands. In this disclosure with respect to FIGS. 12A-14, a part is actually a sandwich panel that is being formed and the contour shown in FIG. 13 is an aerodynamic surface that is the pressure side of a public domain airfoil, the NACA series 65 airfoil, which has been, over the years, thoroughly defined and thoroughly tested. In this case, there is a core and two skins that form the sandwich panel that is being dynamically shaped. Note that Applicant's 3D fiber technology shown in FIG. 18, wherein 3D fibers tie the core to the skins may be used for this aerodynamic surface of FIG. 13. As shown in FIG. 18, the surface is a structural sandwich panel or fiber composite material wall. Each wall includes a first sandwich skin 131, a second sandwich skin 133, interior foam core 135, and distinct groups 137 of 3D Z-axis fibers that extend from the first sandwich skin 131 to the second sandwich skin 133, linking the sandwich skins 131, 135 together. The 3D insertions of fiber is described in applicant's U.S. Pat. Nos. 7,056,576, 7,217,453, 7,731,046, 7,785,693, 7,846,528, 7,387,147, 6,676,785, 6,645,333, 7,105,071, 8,002,919, and 8,272,188, which are incorporated by reference herein.

It is important to note that the curved surface and composite shape of FIG. 13 was created with this new machine and a CAD program, feeding into a motion control program and most significantly there were no molds manufactured for this specific shape. An infinite number of shapes can be made with this machine and zero molds are needed. Additionally, in a further aspect, the heated die shown and described with respect to FIGS. 1-8 is a variable curvature die, operating in a similar fashion to the chilled bands 1040 and 1042.

Figure 14:
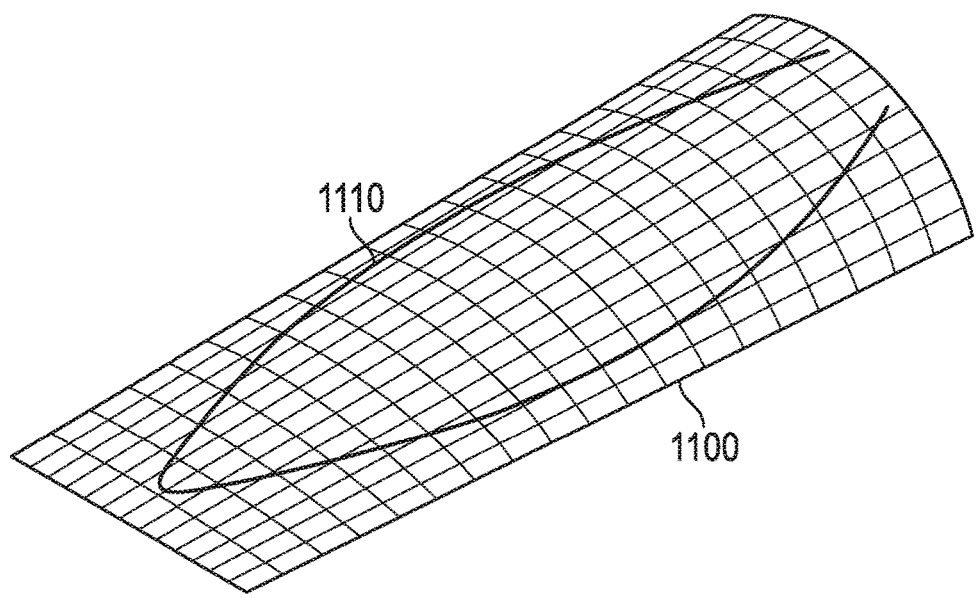
FIG. 14 shows a section of another embodiment of a thermoplastic composite resulting from the 3D thermoplastic composite pultrusion system and method where the thermoplastic composite is not only curved but also has a twist.
Figure 15:
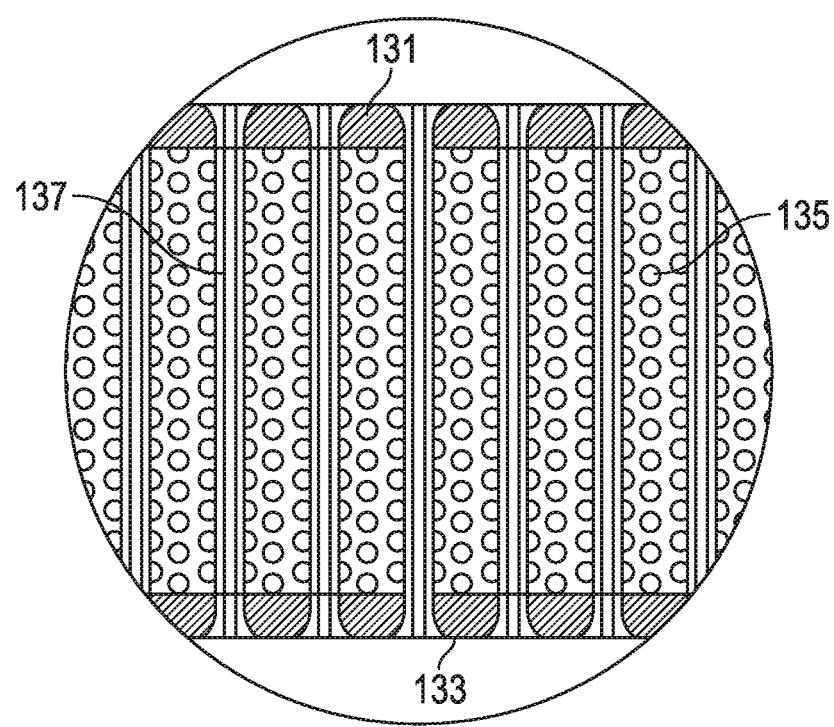
FIG. 15 shows a cross-sectional view of an embodiment of a structural sandwich panel or fiber composite material wall of a surface or part produced by a method described herein.

The 3D thermoplastic pultrusion system and method is significantly important to US industry. Automotive doors can be made in rapid fashion and tooling can be minimized. In the aircraft industry, one can now make propellers from thermoplastic composite, by simply programming a machine. Note that FIG. 14 shows a thermoplastic composite that is not only curved but has a twist. Once formed the propeller could be machined along 1110, shown in FIG. 14, and with very little post processing, be completed into a finished composite propeller. Note that this can be accomplished with no molds.

The example computer system 550 shown and described with respect to FIG. 11 provides the computer control described here for the 3D thermoplastic pultrusion system and method.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or"

unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A 3D thermoplastic pultrusion system for creating a 3D thermoplastic composite pultrusion from a fiber thermoplastic composite material, comprising:
    a heated pultrusion die to heat, consolidate, and press the fiber thermoplastic composite material;
    one or more sets of 3D thermoplastic forming machines located downstream of the heated pultrusion die, the one or more sets of 3D thermoplastic forming machines including one or more pairs of shapeable and flexible actively chilled bands, each pair being capable of applying pressure at a specific thickness to the fiber thermoplastic composite material pultrusion from opposite sides;
    a pultrusion gripper mechanism having one or more grippers in series located downstream of the one or more sets of 3D thermoplastic forming machines;
    a CNC control system controlling the one or more sets of 3D thermoplastic forming machines to shape the one or more pairs of flexible actively chilled bands,
    a 3D thermoplastic pultrusion system computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements is configured to perform the following for a given cross-section of the fiber thermoplastic composite material:
    incrementally advance the fiber thermoplastic composite material into the heated pultrusion die in a no compression condition using the pultrusion gripper mechanism,
    followed by incrementally consolidating and heating the fiber thermoplastic composite material by compressing and heating the fiber thermoplastic composite material with the thermoplastic pultrusion die in a compression condition and at a zero line speed,
    followed by first releasing the thermoplastic pultrusion die and incrementally advancing the heated and consolidated fiber thermoplastic composite material an incremental distance, with the thermoplastic pultrusion die in a no compression condition using the pultrusion gripper mechanism,
    followed by simultaneous forming and chilling the pultruded heated fiber thermoplastic composite material into a 3D thermoplastic composite pultrusion having varying surface contours in both a pultrusion direction and 90 degrees to the pultrusion direction by simultaneously chilling the pultruded heated fiber thermoplastic composite material and applying pressure with the one or more pairs of flexible actively chilled bands,
    programmed to be displaced in a manner such that the composite is chilled at a specific thickness assuring chilling at sufficient pressure with the one or more sets of 3D thermoplastic forming machines at a zero line speed,
    followed by opening the one or more sets of 3D thermoplastic forming machines and advancing the 3D thermoplastic composite pultrusion an incremental distance using the pultrusion gripper mechanism.

2. The 3D thermoplastic pultrusion system of claim 1, wherein the one or more sets of 3D thermoplastic forming machines do not include molds.

3. The 3D thermoplastic pultrusion system of claim 1, wherein the one or more sets of 3D thermoplastic forming machines include a plurality of CNC actuators connected to the one or more pairs of flexible actively chilled bands shapeable by the CNC actuators to form the heated fiber thermoplastic composite material into the 3D thermoplastic composite pultrusion.

4. The 3D thermoplastic pultrusion system of claim 3, wherein the CNC actuators include at least two degrees of motion, an axial degree of motion and a non-axial degree of motion.

5. The 3D thermoplastic pultrusion system of claim 3, wherein the CNC actuators include three degrees of motion, an axial degree of motion and two non-axial degrees of motion.

6. The 3D thermoplastic pultrusion system of claim 3, further including swivel joints connecting the plurality of CNC actuators to the one or more pairs of flexible actively chilled bands, the swivels joints enabling pivoting movement of the one or more pairs of flexible actively chilled bands relative to the CNC actuators and enabling the CNC actuators to push, pull, rotate, and move the one or more pairs of flexible actively chilled bands.

7. The 3D thermoplastic pultrusion system of claim 3, further including actuator bearings, and the CNC actuators rotatable about the actuator bearing.

8. The 3D thermoplastic pultrusion system of claim 1, wherein the pultrusion gripper mechanism is capable of CNC movement and gripping the chilled thermoplastic composite having various changing shapes in the pultrusion direction.

9. The 3D thermoplastic pultrusion system of claim 1, wherein the 3D thermoplastic pultrusion is a member from the group consisting of aerospace composites, automotive composites, doors, hoods, aircraft body panels, luggage compartments, airplane interior sections, aerodynamic surfaces, piping, and duct-work.

10. The 3D thermoplastic pultrusion system of claim 1, wherein the pultruded heated fiber thermoplastic composite material includes a fiber composite material including a first sandwich skin, a second sandwich skin, an interior core, and distinct groups of 3D Z-axis fibers that extend from the first sandwich skin to the second sandwich skin, linking the sandwich skins together.

11. The 3D thermoplastic pultrusion system of claim 3, wherein the 3D thermoplastic forming machines include thrusting and retracting plates attached to the actuators.

12. The 3D thermoplastic pultrusion system of claim 1, wherein the one or more pairs of flexible actively chilled bands are actively chilled by one of fluid cooling and air flow cooling.

13. The 3D thermoplastic pultrusion system of claim 1, wherein the one or more computer programmed module elements is configured to perform the recited steps on different sections of a continuous pultrusion of the fiber thermoplastic composite material such that continuous operation is coordinated.

14. A 3D thermoplastic pultrusion system for creating a 3D thermoplastic composite pultrusion from a fiber thermoplastic composite material, comprising:
   a heated pultrusion die to heat, consolidate, and press the fiber thermoplastic composite material;
   one or more sets of 3D thermoplastic forming machines located downstream of the heated pultrusion die, the one or more sets of 3D thermoplastic forming machines including one or more pairs of shapeable and flexible chilled bands and a plurality of CNC actuators connected to the one or more pairs of flexible chilled bands shapeable by the CNC actuators to form the heated prepreg thermoplastic composite material into the 3D thermoplastic composite pultrusion, each pair of flexible chilled bands being capable of applying pressure at a specific thickness to the fiber thermoplastic composite material pultrusion from opposite sides, the CNC actuators including at least two degrees of motion, an axial degree of motion and a non-axial degree of motion;
   a material advancement mechanism located downstream of the one or more sets of 3D thermoplastic forming machines;
   a CNC control system controlling the one or more sets of 3D thermoplastic forming machines to shape the one or more pairs of flexible chilled bands,
   a 3D thermoplastic pultrusion system computer system includes a computer readable medium configured to store executable programmed modules; a processor communicatively coupled with the computer readable medium configured to execute programmed modules stored therein; one or more computer programmed module elements stored in the computer readable medium and configured to be executed by the processor, wherein the one or more computer programmed module elements is configured to perform the following for a given cross-section of the fiber thermoplastic composite material:
      incrementally advance the fiber thermoplastic composite material into the heated pultrusion die in a no compression condition using the material advancement mechanism,
      followed by incrementally consolidating and heating the fiber thermoplastic composite material by compressing and heating the fiber thermoplastic composite material with the thermoplastic pultrusion die in a compression condition and at a zero line speed,
      followed by first releasing the thermoplastic pultrusion die and incrementally advancing the heated and consolidated fiber thermoplastic composite material an incremental distance, with the thermoplastic pultrusion die in a no compression condition using the material advancement mechanism,
      followed by simultaneous forming and chilling the pultruded heated fiber thermoplastic composite material into a 3D thermoplastic composite pultrusion having varying surface contours in both a pultrusion direction and 90 degrees to the pultrusion direction with the plurality of CNC actuators moving in at least two degrees of motion, an axial degree of motion and a non-axial degree of motion, to control the one or more pairs of flexible chilled bands of the one or more sets of 3D thermoplastic forming machines at a zero line speed,
      followed by opening the one or more sets of 3D thermoplastic forming machines and advancing the 3D thermoplastic composite pultrusion an incremental distance using the material advancement mechanism.

15. The 3D thermoplastic pultrusion system of claim 14, wherein the CNC actuators include three degrees of motion, an axial degree of motion and two non-axial degrees of motion.

16. The 3D thermoplastic pultrusion system of claim 14, further including swivel joints connecting the plurality of CNC actuators to the one or more pairs of flexible actively chilled bands, the swivels joints enabling pivoting movement of the one or more pairs of flexible actively chilled bands relative to the CNC actuators and enabling the CNC actuators to push, pull, rotate, and move the one or more pairs of flexible actively chilled bands.

17. The 3D thermoplastic pultrusion system of claim 14, further including actuator bearings, and the CNC actuators rotatable about the actuator bearings.

18. The 3D thermoplastic pultrusion system of claim 14, wherein the one or more computer programmed module elements is configured to perform the recited steps on different sections of a continuous pultrusion of the fiber thermoplastic composite material such that continuous operation is coordinated.

* * * * *